(12) United States Patent
Matsui et al.

(10) Patent No.: US 7,134,128 B2
(45) Date of Patent: Nov. 7, 2006

(54) DISK DRIVE WITH PROTECTION FROM STATIC ELECTRICITY

(75) Inventors: Nobuki Matsui, Tokyo (JP); Takashi Watanabe, Tokyo (JP)

(73) Assignee: Teac Corporation, Tokyo (JP)

( * ) Notice: Subject to any disclaimer, the term of this patent is extended or adjusted under 35 U.S.C. 154(b) by 122 days.

(21) Appl. No.: 10/697,574

(22) Filed: Oct. 30, 2003

(65) Prior Publication Data
US 2004/0163094 A1    Aug. 19, 2004

(30) Foreign Application Priority Data
Oct. 31, 2002    (JP)    ............. 2002-318346
Oct. 31, 2002    (JP)    ............. 2002-318410

(51) Int. Cl.
*G11B 33/14*    (2006.01)
(52) U.S. Cl. ...................... 720/650
(58) Field of Classification Search .......... 720/650
See application file for complete search history.

(56) References Cited

U.S. PATENT DOCUMENTS 5,684,775 A * 11/1997 Tanaka et al. ............. 720/650

FOREIGN PATENT DOCUMENTS

JP    08-171787    7/1996
KR    1996-24966    7/1996

* cited by examiner

*Primary Examiner*—David Davis
(74) *Attorney, Agent, or Firm*—Weingarten, Schurgin, Gagnebin & Lebovici LLP

(57) ABSTRACT

To simplify incidental operations relating to setting of an earth plate for discharging static electricity of a disk drive for driving an optical disk, reduce the processing cost accompanying assembling of a bezel, and improve the versatility of the disk drive so that the bezel can be manufactured with a simple configuration at a low cost in order to set the bezel to the front end face of the disk drive through post-mount processing, and moreover to make it possible to supply a disk drive to unspecified users at a stable quality without lacking in specifications required to a disk tray for keeping a desired performance. In the case of a disk drive for loading or unloading a disk tray 1 to which a recording medium is set by moving the disk tray 1 forward or backward in a chassis case 10, an earth plate 9 for discharging static electricity generated at a bezel portion 8 is set so as to cover an essential portion of the front end face of the disk tray 1 at the disk tray 1 side. Moreover, in the case of a disk drive for loading or unloading a disk tray to which a recording medium D is set by moving the disk tray forward or backward in a chassis case, it is made possible to fix an inner bezel in which element components are mounted on the front end face of the disk tray and moreover integrate an outer bezel with the inner bezel by setting the outer bezel to the outside of the inner bezel.

11 Claims, 29 Drawing Sheets

DISK DRIVE WITH PROTECTION FROM STATIC ELECTRICITY

This application claims priority to Japanese application No. 2002-318346 filed Oct. 31, 2002, and to Japanese application No. 2002-318410 filed Oct. 31, 2002.

BACKGROUND OF THE INVENTION

1. Field of the Invention

The present invention relates to a disk drive for driving an optical disk such as a CD (Compact Disk) or DVD (Digital Versatile Disk) generally used as a recording medium, particularly to a configuration for protecting electronic components in the disk drive from static electricity generated due to an external cause and moreover to improvement of a bezel to be mounted to the front end face of the disk tray.

2. Detailed Description of the Related Art

In general, a disk drive for driving an optical disk is integrally built in a device body such as a personal computer (hereafter referred to as PC), in which information is recorded in or reproduced from the optical disk (for example, refer to Patent Documents 1 and 2). FIG. 18 shows the appearance of a notebook PC having the built-in disk drive described above. Normally, in such disk drive, a disk tray 101 pops out in accordance with a switch operation or a command from a PC body and a PC user then takes out the disk tray 101 so as to Bet an optical disk D.

FIG. 19 shows the appearance of a disk drive frequently used for notebook PCs in particular. As shown in the figure, a center hole of the optical disk D is clamped at the center of the disk tray 101 by a clamp mechanism 102a of a turntable 102 fixed to a driving shaft of a spindle motor set just below the disk tray 101 to transfer torque. Moreover, a head unit 103 mainly constituted by an optical pickup moves in the radial direction in a slit 101a formed on the disk tray 101 to record or reproduce information in or from the optical disk D. Furthermore, the disk tray 101 thus constituted is supported by a guide rail 104 so as to be housed in a chassis case 105.

FIG. 30 is an exploded perspective view showing a configuration of the front end face of the disk tray 101, in which a printed wiring sheet P is adhered to the center of the front end face of the body of the disk tray 101, and a microswitch 109 for receiving an activation signal for controlling forward and backward movements of the disk tray 101 and an LED chip 100 serving as an indicator are soldered to the printed wiring sheet P. Moreover, a bezel 111 screwed so as to cover the front end face of the disk tray 101 to outfit the front face of the disk drive is provided with a push button 120 for operating the microswitch 109 LED chip 100. Symbol 140 denotes a through-hole for forcibly canceling an unexpected locked state of the disk tray 101 by inserting a thin pin from the through-hole 140.

FIG. 31 is an illustration showing a back face of the conventional bezel 111, in which an earth plate 150 is fixed to the center through thermal caulking or the like. The earth plate 150 is set so that when the disk tray 101 is loaded, the end 150a of the plate 150 contacts with the opening of the chassis case 105 and a discharge channel is formed. Thereby, static electricity flows from a human body to the discharge channel to prevent an electrical component or the like from damaging. Moreover, a flexible spacer 160 serving as a buffering body is set to the upper edge part and a screwed tongue 110a to be fixed to the body of the disk tray 101 is formed at an essential portion of the body of the bezel 111. An end 150b of the earth plate 150 is extended to the back of the push button 120 and a protrusion 120a of the push button 120 exposed from a window hole formed on the end 150b operates the microswitch 109.

[Patent Document 1]
Japanese Patent Application No. 2002-97122
[Patent Document 2]
Japanese Patent Application No. 2002-97056

The bezel decorates the front face of the disk drive, which usually uses a bezel designed in accordance with a PC. Therefore, in many cases, a supplier delivers a finished disk drive alone with no bezel mounted on it, a PC manufacturer receiving the disk drive then manufactures an original bezel and fixes the bezel to the front face of the disk tray. However, because an earth plate is conventionally integrated with a bezel through thermal caulking the caulking cost is an obstacle to lower the production cost of the disk tray.

Therefore, it is an object of the present invention to simplify the above incidental processing to the utmost so that the processing cost for the assembling of the bezel can be decreased and the versatility of the disk drive is improved. Moreover, as shown in FIGS. 30 and 31, the bezel of the disk tray of the conventional disk drive has element components necessary for the bezel, namely, the push button 120, transparent lens 130, earth plate 150, and spacer 160 to serve the bezel as an outfit body. Accordingly, the bezel is usually designed to be match with the PC body and it is desirable that the bezel is formed by the same color and same material with the PC body.

However, in the case of a manufacture and supply system for manufacturing a disk drive alone and supplying it to unspecified users such as many manufacturers of PCs, because manufacturers of PC bodies are completely different from those of disk drives, it is difficult to realize a bezel whose design, color tone, and texture coincide with those of the PC body which is built in by a supplied destination of the disk drive, by the difference between manufactures of PC body and the disk drive. As a solution for such problem, an user received a finished disk drive prepares only a bezel and replace the bezel already set by the disk drive manufacturer with the one prepared by the user, or the user receives a disk drive with no bezel mounted and sets an original bezel to the disk drive, namely manage the problem with so-called post-mount processing.

When using the above method, the user received the disk drive needs to originally design the bezel and element components to be built in the bezel and prepare a molding die or the like to manufacture the bezel. Consequently, the user must shoulder a great deal of economic burden. In addition, despite of the effort made by the user to manufacture the original bezel, a design including errors compared to the finished bezel may be done and the initial performance may be deteriorated. For example, the shape of an earth plate which is an element component differs or when the earth plate is not built in, the resistance of the disk drive to static electricity is deteriorated and therefore, the risk of damage on the electronic components rises. Moreover, the structural consistency with the disk tray is deteriorated because the bezel was originally designed, so the bezel may vibrate and generate noises or the operation feeling of the disk tray may be deteriorated.

SUMMARY OF THE INVENTION

The present invention is made to solve the above conventional problems and its object is to make it possible to manufacture the bezel for the post-mounting processing for unifying it with the PC in which the disk drive is built in design, color tone, and texture at low cost by a simple configuration and supply disk drives to unspecified users at a stable quality without lacking in specifications required for a disk tray for keeping a desired performance even in the case of the post-mount processing of the bezel.

To solve the above problems, according to the present invention, a disk drive is constituted by a chassis case, a disk tray capable of moving between a loading position inside the chassis and an unloading position outside the chassis case while supporting a recording medium, a bezel attached to the disk tray so as to cover the front end face of the disk tray, and an earth plate attached to the front end face of the disk tray to discharge static electricity; and is constituted so that the static electricity generated at the front side of the disk tray is guided to the earth plate.

According to the present invention, the disk tray supports a supporting rotation means of a disk which rotates while supporting the disk.

According to the present invention, the disk drive further includes an operating means to be operated when moving the disk tray located at the loading position toward the unloading position, and the earth plate is set adjacently to the operating means.

According to the present invention, the disk drive further includes an electrical display means for showing an operation state of the drive, and the earth plate is set adjacently to the electrical displaying means.

According to the present invention, in the disk drive, the chassis case has conductivity and the earth plate is electrically connected to the chassis case when the disk tray is located at the loading position to supply static electricity generated at the front side of the disk tray to the chassis case.

According to the present invention, in the disk drive, the disk tray is provided with an earth plate attaching portion to which the earth plate is attached and a bezel attaching portion to which the bezel is attached.

According to the present invention, in the disk drive, the earth plate fixed to the disk tray so as to cover at least a part of the front end face of the disk tray is exposed to the front end of the disk tray when taking out the bezel from the disk tray.

According to the present invention, in the disk drive, the disk tray is constituted by a disk tray main body and an inner bezel attached to the front end face of the disk tray, the earth plate is set between the disk tray main body and the inner bezel, and the bezel is attached to the front end of the disk tray so as to cover the inner bezel of the disk tray.

According to the present invention, in the disk drive, the bezel formed like a plate is fixed to the inner bezel of the disk tray.

According to the present invention, in the disk drive, the bezel formed like a shallow pan is fitted to the inner bezel of the disk tray.

According to the present invention, the disk drive is constituted by the chassis case, the disk tray capable of moving between the loading position inside the chassis case and the unloading position outside the chassis case while supporting the recording medium and having the bezel attaching portion end to be able to attach the bezel on the front end, and an earth plate attached to the front end face of the disk tray to discharge static electricity, and in which the static electricity generated at the front side of the disk tray is guided to the earth plate.

According to the present invention, in the disk drive, the disk tray supports the supporting rotation means of the disk which rotates the disk while supporting it.

According to the present invention, the disk drive further includes the operating means to be operated when moving the disk tray located at the loading position toward the unloading position and in which the earth plate is set adjacently to the operating means.

According to the present invention, the disk drive further includes the electrical displaying means for showing an operation state of the drive and in which the earth plate is set adjacently to the electrical displaying means.

According to the present invention, in the disk drive, the chassis case has conductivity and the earth plate is electrically connected to the chassis case when the disk tray is located at the loading position to supply the static electricity generated at the front side of the disk tray to the chassis case.

According to the present invention, in the disk drive, the disk tray is constituted by the disk tray body and the inner bezel attached to the front end of the disk tray body, and the earth plate is set between the disk tray body and the inner bezel.

According to the present invention, a disk drive manufacturing method comprises a step of integrating the disk tray with the earth plate and a step of integrating the bezel with the front end of the disk tray integrated with the earth plate, in which the disk drive includes the chassis case, the disk tray capable of moving between the loading position inside the chassis case arid the unloading position outside the chassis case while supporting the recording medium, the bezel attached to the disk tray so as to cover the front end of the disk tray, and the earth plate set to the front end side of the disk tray to discharge static electricity.

According to the present invention, in the disk drive manufacturing method, the disk tray is constituted by the disk tray body and the inner bezel attached to the front end of the disk tray body, and the step of integrating the disk tray with the earth plate includes a step of integrating the inner bezel with the earth plate and a step of integrating the inner bezel integrated with the earth plate with the disk tray body.

DESCRIPTION OF SYMBOLS

Figure 1:
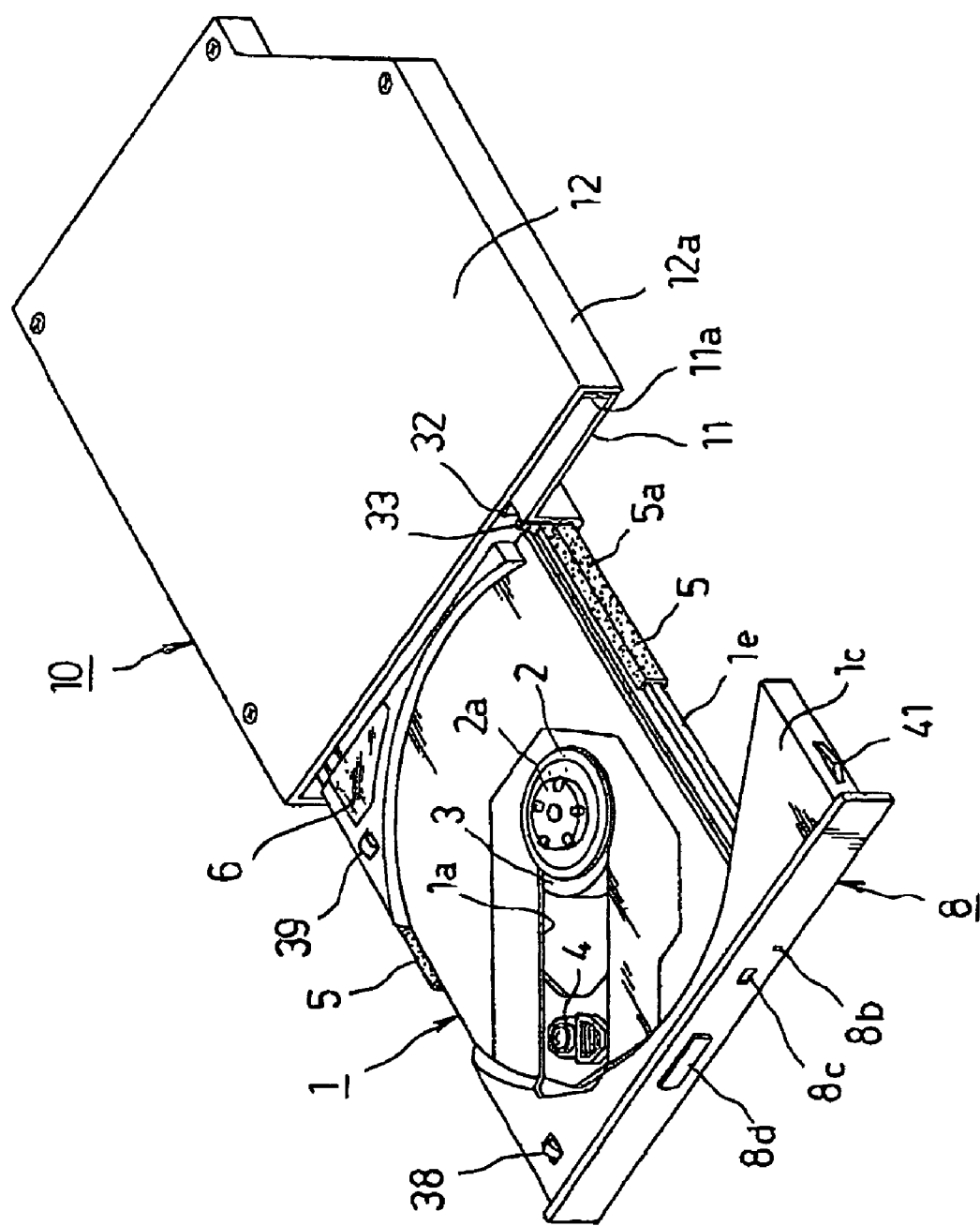
FIG. 1 is a perspective view of a disk drive in which a disk tray is unloaded.

A. Driving mechanism
B. Ejecting/locking mechanism
C. Slider mechanism
D. Optical disk
1, 101. Disk tray
1a, 101a. Slit
1c. Side arm
1d. Insertion hole
1e. Convex thread
1f. Window hole
1g. Bearing block
1h. Angle
1i. Positioning boss
1j. Securing protrusion
2, Turntable
3. Spindle motor
4, Head unit
5, Guide rail
5a. Fine ruggedness
6. Sealing material
7. Printed circuit board,
8, Bezel
8b. Through-hole
9. Earth plate
10, Chassis case
11. Base chassis
12. Cover chassis
13. Holding rail
14. Short-circuit member
15. Bottom cover
16. Thread motor
17. Gear unit
18. Guide shaft
19. Teeth member
19b. Teeth
20. Screw shaft
20a. Guide groove
21. Support member
23. Gear frame
24. Bearing groove
25. Cover plate
27. Self-holding solenoid
28. Cancel lever
29. Lock lever
29a. Resin main portion
29b. Steel sheet mold material
29d. Slope
29e. Angle portion
30. Return lever
32. Return pin
33. Lock pin
35. Pop-out mechanism
38. Roller
39. Roller
40. Support plate
41. Slider
41b. Slope
42. Torsion coil spring
101b. Securing through-hole
101c. Concave portion
102a. Clamp head or clamp mechanism
109. Microswitch
100. LED chip
110a. Tongue
120. Push button
120. Push button
120a. Protrusion
130. Transparent lens
140. Through-hole
150. Earth plate
150a. End
150b. End
160. Spacer
170. Bezel
180. Inner bezel
180a. Securing nail
180b. Through-hole
180c. Concave cutout
180e. Window hole
190. Outer bezel
190a. Window hole
190b. Window hole
190c. Convex portion
190d. Securing nail
190e. Through-hole
200. Transparent lens
121. Bezel
122. Inner bezel
122a. Securing nail piece
122b. Through-hole
122c. Securing concave portion
122d. Securing concave portion
123. Outer bezel
123a. Window hole
123b. Window hole
123c. Outer periphery margin
123d. Securing nail
123e. Through-hole

DETAILED DESCRIPTION OF THE PREFERRED EMBODIMENT

The present invention is described below in detail by referring to the accompanying drawings. Though the present invention is also preferably applied to a disk drive decreased in thickness, it can be widely applied to existing disk drives. Therefore, applicable objects are not restricted. Moreover, to easily make the disk drive to which the present invention is applied understood, the disk drive is described below together with the outline of the general configuration.

Figure 2:
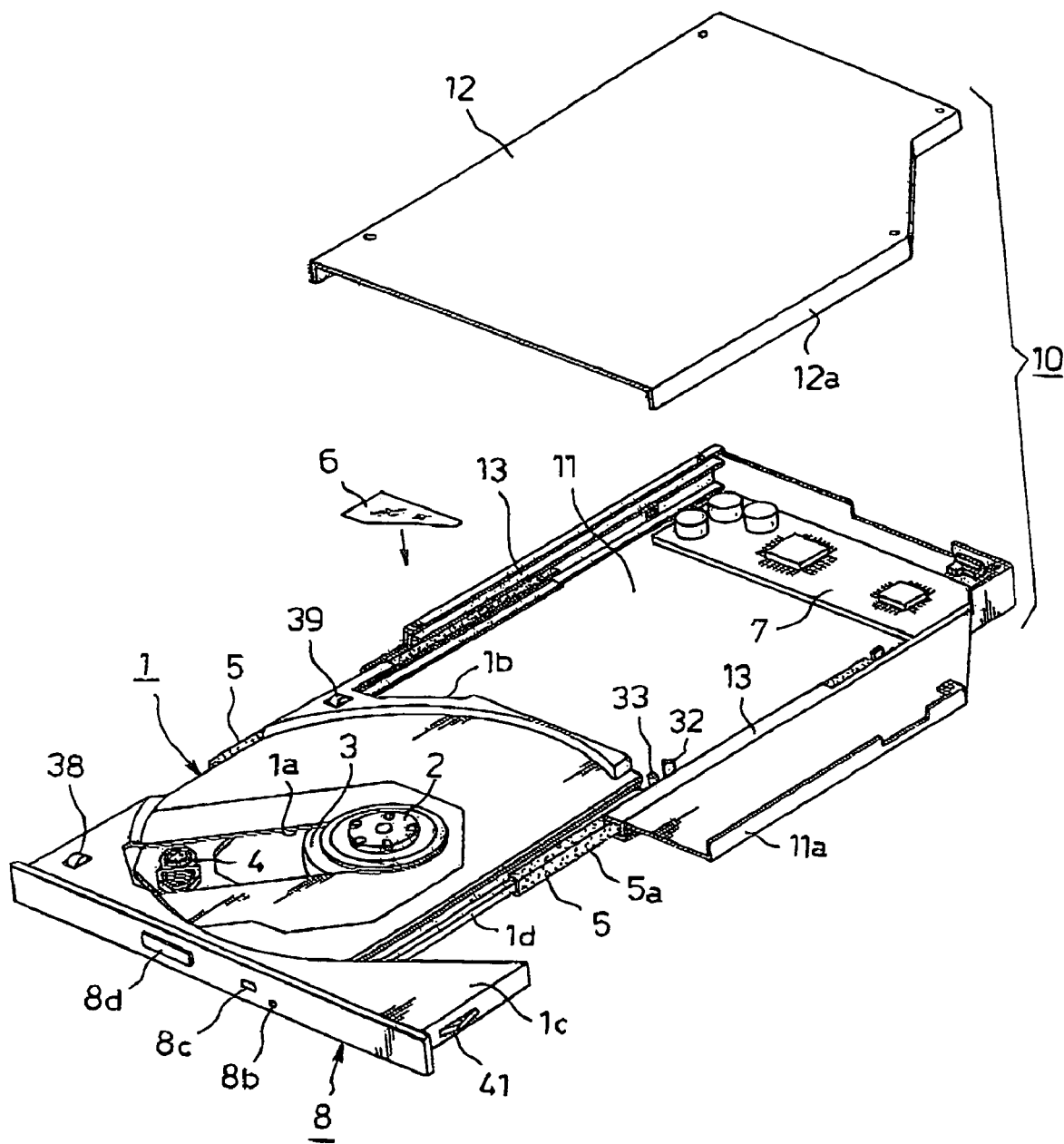
FIG. 2 is a perspective view of a disk drive in which a cover chassis is removed.

FIG. 1 or 2 are perspective views showing the appearance of a disk drive to which the present invention is applied. In the figures, symbol 1 denotes a disk tray integrally formed by a synthetic resin in which a turntable 2 located at the center is fixed to the driving shaft of a spindle motor 3 (shown in FIG. 4) built in the disk tray 1. An optical disk is clamped and rotated by a clamp mechanism 2a integrated with the turntable 2. Moreover, a head unit 4 mainly constituted by an optical pickup moves inside a slit 1a formed on the disk tray 1 in the radial direction to record or reproduce information in or from the optical disk. The disk tray 1 is thus constituted so as to be supported by a guide rail 5 and housed in a chassis case 10.

A cutout 1b for preventing the disk tray 1 from contacting with electronic components of a printed circuit board 7 set to the chassis case 10 is formed at an end of the inner part of the disk tray 1 and the cutout 1b is sealed by a sealing member 6 according to necessity. This configuration is a effective means when constituting a thin disk tray and makes it possible to decrease the wall thickness of the disk tray 1.

Then, the disk tray 1, a side arm 1c for housing a slider mechanism C to be described later is integrally formed at one side of the front end face and moreover, a bezel 8 is set to the front end face of the disk tray 1 so as to insert a tongue 8a of the bezel 8 into an insertion hole id of the disk tray 1. Symbol 8b denotes a through-hole into which an operation pin is inserted in order to forcibly cancel (emergency-eject) the locked state at emergency of an ejecting/locking mechanism in the disk tray 1, symbol 8c denotes an indicator display window, and symbol 8d denotes an operation button for unloading the disk tray 1.

Moreover, an earth plate 9 is set to a securing protrusion 1j of the disk tray 1 by a nail piece 9a of the earth plate 9 at the front end face of the disk tray 1 and an open end 9b of the plate 9 contacts with an opening of the chassis case 10 when the disk tray 1 is loaded to form a discharge channel. The function of the earth plate 9 discharges static electricity to a discharge channel in order to prevent the static electricity from influencing a human body, when the disk tray 1 is forcibly canceled or a finger contacts with an operation button for unloading as described above and thereby preventing electrical components from damaging.

Then, the chassis case 10 molded by a light metal such as aluminum or magnesium is constituted by a base chassis 11 and a cover chassis 12 as shown in FIG. 2 and an opening of the base chassis 11 is covered with the cover chassis 12 and screwed. Then, a holding rail 13 made of a synthetic resin is fixed to the both ends of the base chassis 11 and the metallic guide rail 5 is loosely supported in the holding rail 13, so that it can move forward and backward. Moreover, the guide rail 5 loosely supports a convex rail 1d formed at the both sides of the disk tray 1, so that it can move forward and backward. Therefore, when the disk tray 1 is completely housed in the chassis case 10, the magnetism and the static electricity of the disk tray 1 are sealed by the chassis case 10, the open end 9b of the earth plate 9 contacts with the opening of the chassis case 10, and a discharge channel is formed. According to the configuration of this embodiment, because the earth plate 9 is fixed to the front end face of the disk tray 1, it is possible to prevent the electric components in the disk tray 1 from being influenced by the static electricity even while the bezel 8 is not mounted.

Figure 5:
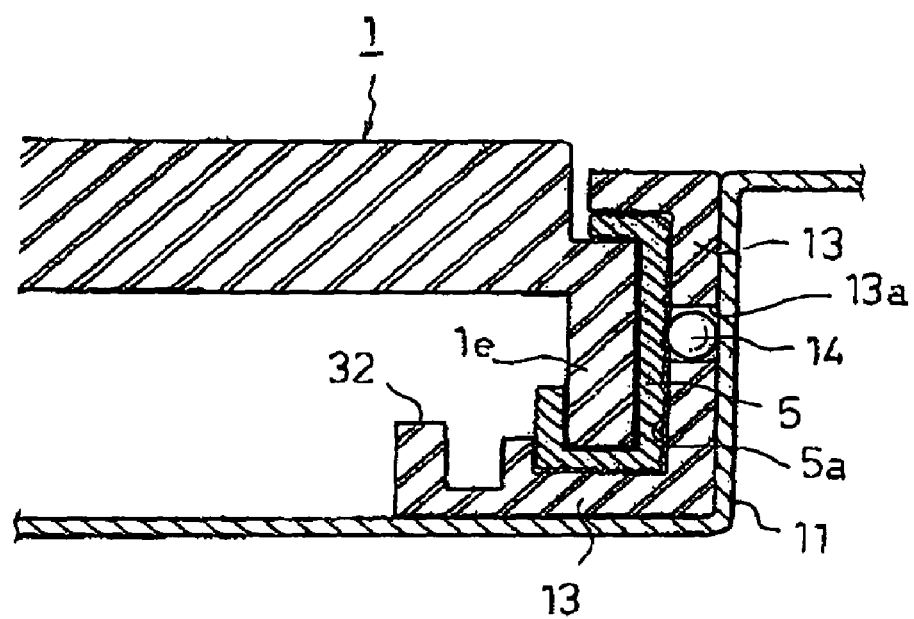
FIG. 5 is a sectional view of a support structure of the disk tray.

FIG. 5 is an enlarged sectional view showing the above configuration, that is, an assembled state of the holding rail 13, the guide rail 5, and a convex rail 1e of the disk tray 1 serving as a transfer mechanism of the disk tray 1. As shown in FIG. 5, satin-finished fine ruggedness 5a is formed on the outer surface of the guide rail 5 of the present invention. This is a processing for reducing slide contact resistance between the holding rail 13 and guide rail 5 and operation feeling for further smooth forward and backward movements of the disk tray 1 is obtained.

The above processing is not applied to a conventional disk drive. However, as a disk drive is decreased in thickness and information is raised in density, the clearance between the holding rail 13 and the guide rail 5 especially becomes very small. This is very important to prevent vibrations or the like from influencing on recording or reproducing information and the clearance is designed so as to be minimized. When the holding rail 13 and the guide rail 5 are constituted under the above condition, the contact rate of a slide contact wall surface rises and the disk tray 1 cannot be smoothly operated because a resistance occurs in the operation of the disk tray 1. Therefore, as described above, by forming the fine ruggedness 5a on the guide rail 5, the slide contact resistance is reduced, so that the smooth operation feeling of the disk tray 1 can be maintained.

The fine ruggedness may be formed on the inside and outside faces of the guide rail 5 or on the holding rail 13 and the convex rail 1d of the disk tray 1. In short, it is only necessary to form a slide contact surface on which the fine ruggedness is formed and a slide contact surface contacting with the former slide contact surface into smooth surfaces. In FIG. 5, symbol 14 denotes a short-circuit member and because the holding rail 13 is an insulator, they are used to electrically connect the guide rail 5 with the base chassis 11. In the case of the embodiment shown in FIG. 5, a steel ball is inserted into a window hole 13a of the holding rail. However, it is also possible to use a leaf spring, a coil spring, or a conductive fiber instead of the steel ball.

Figure 4:
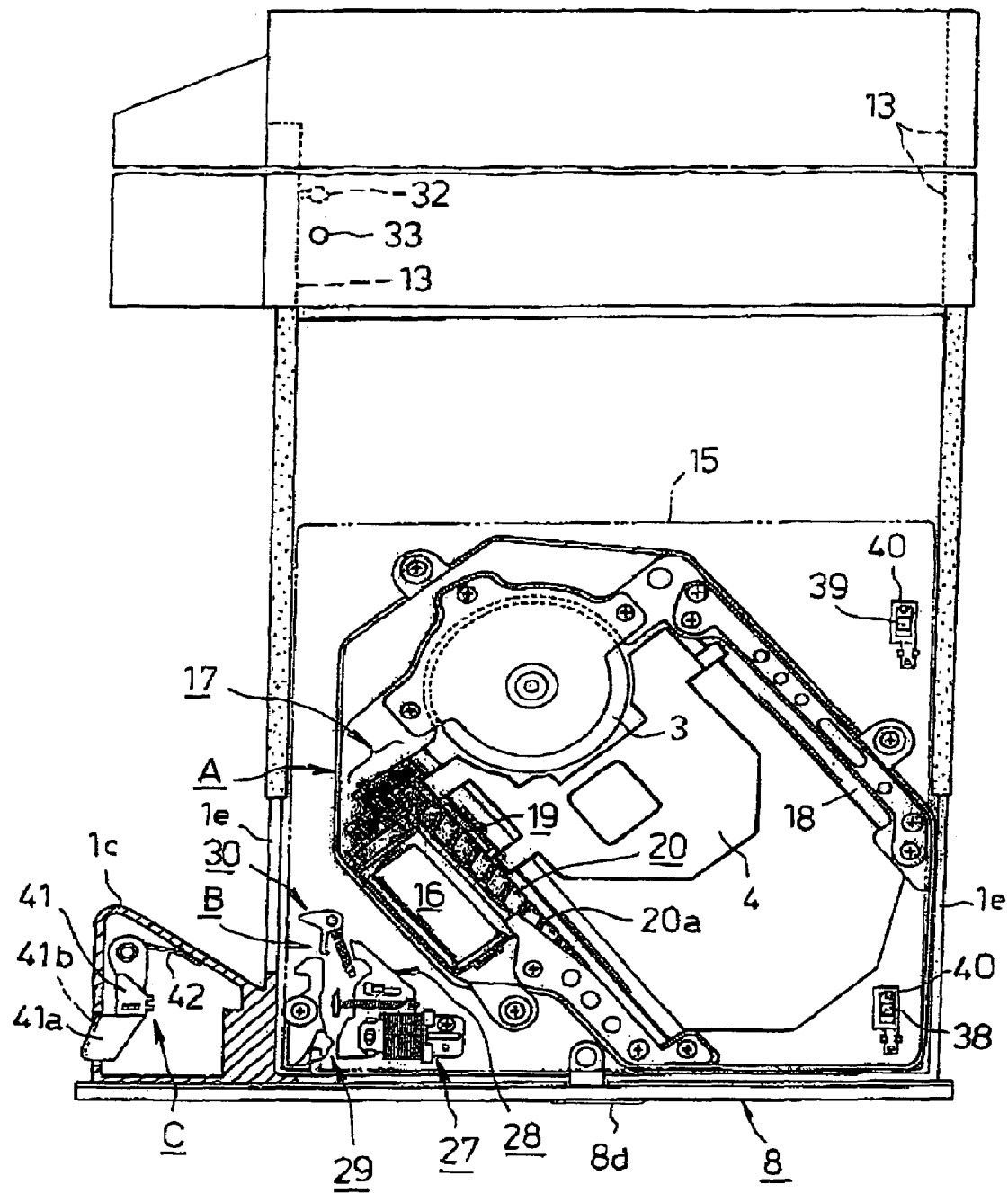
FIG. 4 is an internal configuration of the disk tray.
Figure 6:
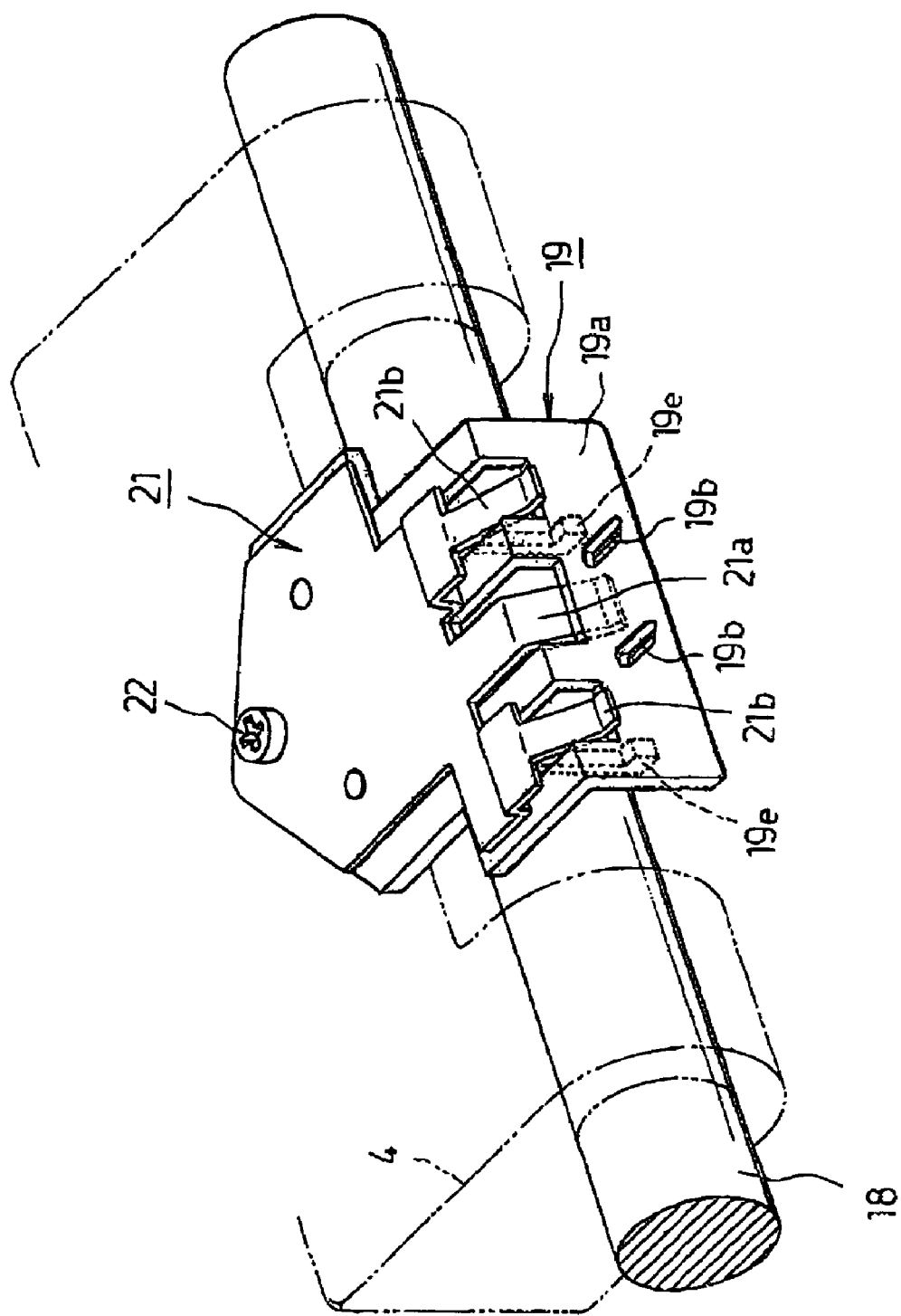
FIG. 6 is a perspective view of a teeth portion of a transfer mechanism of a head unit.

Then, the outline of an internal configuration of the disk tray 1 in the disk drive of the present invention is described below by referring to FIG. 4. FIG. 4 shows a state in which a bottom cover 15 is removed. In the figure, a driving mechanism A is set at the center, which is mainly constituted by a spindle motor 3 for rotating an optical disk, a head unit 4, a thread motor 16 for reciprocating the head unit 4 in the radial direction of the optical disk, and a gear unit 17. Moreover, an ejecting/locking mechanism B is set to the corner of the front end face of the disk tray 1 and a slider mechanism C is set in a side arm 1c. Both ends of the head unit 4 are loosely set to a guide shaft 18 and teeth 19b of a teeth member 19 fixed to the head unit 4 are moved by being guided by a guide groove 20a of a screw shaft 20 so as to reciprocate. FIG. 6 shows an enlarged view of an essential portion of the above configuration, in which main portions of the teeth member 19 and a support member 21 are simultaneously fixed by a screw 22.

Figure 7:
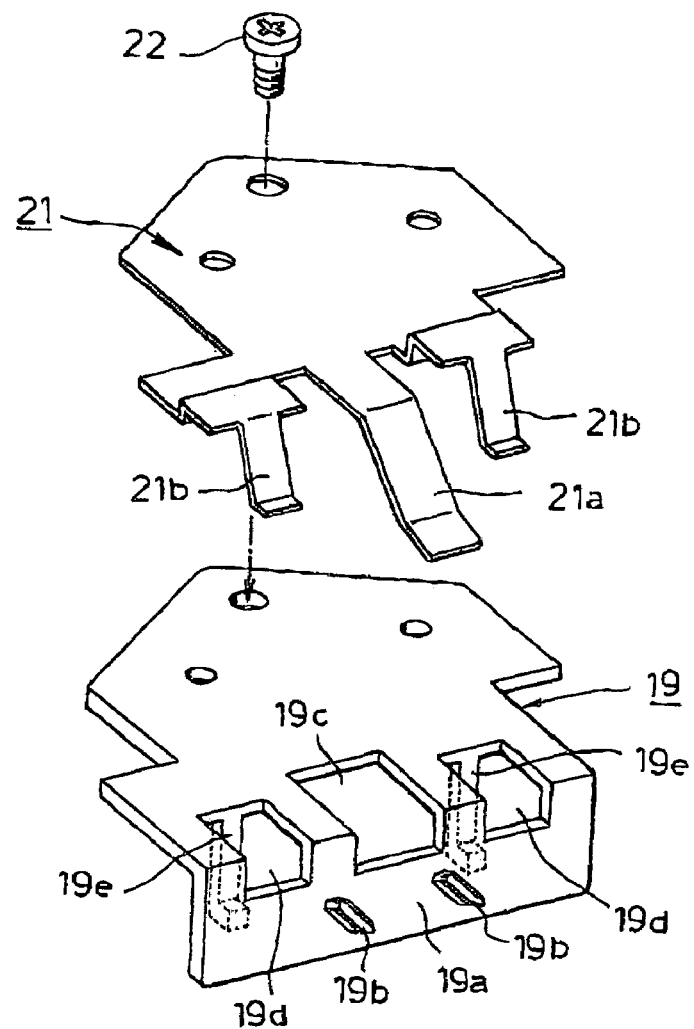
FIG. 7 is a perspective view showing a teeth member and a support member of the head unit.

In the case of the teeth member 19, teeth 19b engaging with the guide groove 20a of the screw shaft 20 are formed on a sagging piece 19a at an end of the main portion, and a window hole 19c is formed at the center as shown in FIG. 7. Moreover, window holes 19d are formed at the right and left of the window hole 19c and a pier stud 19e is integrally formed at the inner part of the window hole 19d while sagged. Furthermore, a support piece 21b for preventing the sagging piece 19a of the teeth member 19 from rising and a pressing piece 21a for supporting the sagging piece 19a while energizing it are formed at an end of the main portion of the support member 21.

Figure 8:
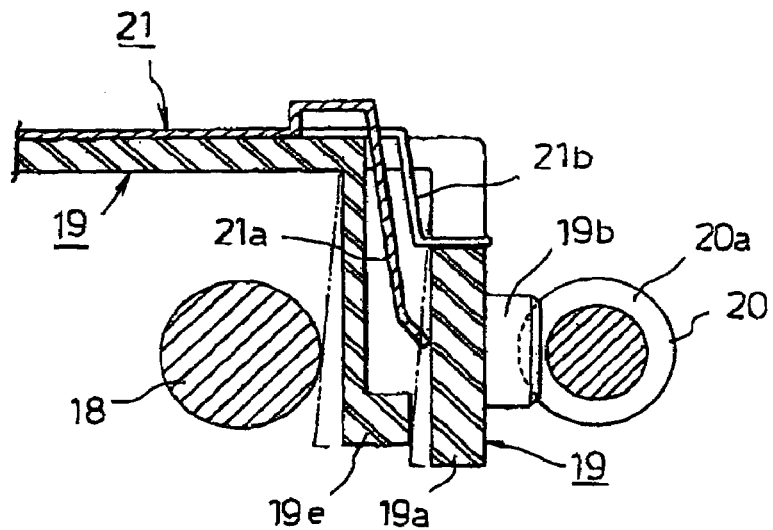
FIG. 8 is a sectional view of an assembled teeth portion of the head unit.

Therefore, by integrally fixing the teeth member 19 and support member 21 to the head unit 4, the sagging piece 19a of the teeth member 19 is energized forward by the pressing piece 21a while it is pressed by the support piece 21b of the support member 21 as shown in FIG. 8. Thereby, engagement of the sagging piece 19a with the screw shaft 20 of the teeth 19b is secured and it is possible to prevent the sagging piece 19a from rising. On the other hand, when a force for depressing the sagging piece 19a by the screw shaft 20 works and the sagging piece 19a is displaced as shown by a virtual line in FIG. 8, the pier stud 19e is also depressed by the sagging piece 19a and contacts with the guide shaft 18, and the displacement of the sagging piece 19a is restricted at this position.

Thus, by combining the support member 21 with the teeth member 19 and fixing them, the teeth 19b of the sagging piece 19a can be prevented from removing from the guide groove 20a of the screw shaft 20, and it becomes possible to correspond to increase of the access speed of the head unit 4 to an optical disk. That is, as the recording density of the optical disk is improved, the frequency of the reciprocation of the head unit 4 rises and moreover, the rotational speed of the screw shaft 20 also rises because the access speed is accelerated.

Under such situation, a sudden torque is added to the teeth 19b of the sagging piece 19a from the guide groove 20a of the screw shaft 20 and in that instant, component force in upward or downward is generated and thereby, the sagging piece 19a is raised or depressed, the engagement between the teeth 19b and the guide groove 20a becomes shallow, and a danger increases that the teeth 19b are removed. Such phenomenon remarkably appears at the trailing end of the guide groove 20a of the screw shaft 20 in particular, and the probability increases that the teeth 19b are removed from the guide groove 20a. However, by using the above configuration, it is possible to completely prevent the teeth 19b from being removed from the guide groove 20a.

Then, a configuration of the gear unit 17 for rotating the screw shaft 20 is described below. Conventionally, a gear unit of the above portion has been manually constituted by inserting the shaft of each gear into a bearing hole formed on a gear frame. However, in the case of the above manual operation, a tooth row usually molded by of a synthetic resin may be frequently damaged and when the damaged gear is included in the gear unit, a problem occurs that the so-called seek noise increases.

Figure 9:
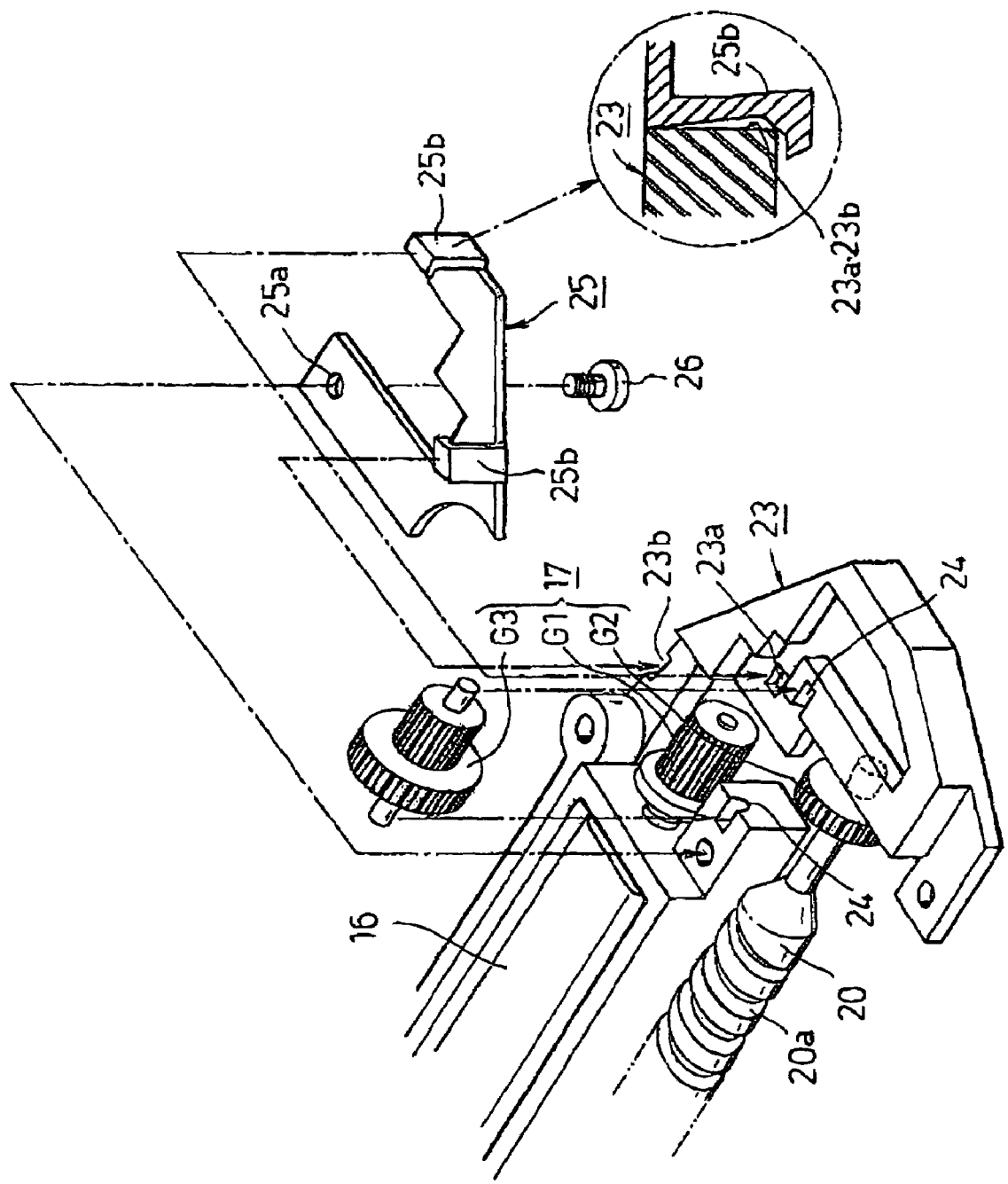
FIG. 9 is a perspective view for explaining an assembled state of a gear unit of a driving mechanism.

Thus, the disk drive of the present invention uses the configuration shown in FIG. 9. In the case of the configuration shown in FIG. 9, the gear unit 17 is constituted by combining three single gears G1, G2, and G3, and the gear G1 is fixed to an output shaft of the thread motor 16. On the other hand, the gear G2 is fixed to the screw shaft 20 to which the torque of the thread motor 16 is transferred and the shaft of the gear 20 is inserted into a bearing hole formed on a gear frame. Under such state, by inserting the shaft of the gear G3 into a bearing groove 24 formed on a gear frame 23, it is possible to smoothly set the gear G3.

That is, because the gear G3 is conventionally installed by inserting a gear shaft into a bearing hole, it is impossible to keep the horizontality of the gear when it is installed and a tooth row is damaged. However, when using the above configuration, it is possible to install the gear G3 while keeping the horizontality. Moreover, because the gears G1 and G2 rotate according to the installment of the gear G3, no excessive load is applied to each tooth row and thereby, it is possible to avoid the gear unit 17 from being damaged when assembled.

When using the configuration of the gear unit 17, the shaft of the gear G3 is loosely inserted into the bearing groove 24. Therefore, a cover plate 25 is set in order to prevent the gear G3 from being removed. As shown by an inverted state in FIG. 9, a screw through-hole 25a is formed at one end of the cover plate 25 and a securing nail 25b is formed at two places of the other end. When fixing one end of the cover plate 25 to the gear frame 23 by a screw 26, one securing nail 25b at the other end engages with the window hole 23a formed on the gear frame 23 and the other securing nail 25b engages with a securing step 23b. Moreover, when the above securing nails 25b engage with the window hole 23a and securing step 23b respectively, a slope formed at the corner of undercut portion of the securing nail 25b contacts with the top edge of the gear frame 23 at the engagement position as shown by the enlarged view in FIG. 9. Thereby, because it is possible to firmly fix the cover plate 25, the cover plate 25 does not vibrate or generate noises even if vibrations are propagated from the thread motor 16 and gear unit 17.

Then, a configuration and operation modes of the ejecting/locking mechanism B used for the disk drive of the present invention are described below. The ejecting/locking mechanism B is used to fix a state in which the disk tray 1 is loaded in the chassis case 10 or cancel the fixed state so that the disk tray 1 can be unloaded, which is constituted by combining a self-holding solenoid 27, a cancel lever 28, a lock lever 29, and a return lever 30.

In the case of the self-holding solenoid 27, front ends of a pair of yokes 27a and 27b are inserted from rear ends up to almost the middle positions of energizing coils 27c and 27d and fixed. Moreover, a permanent magnet 27e is mounted to ends of the yokes 27a and 27b and thereby, a horseshoe magnetic circuit is formed. On the other hand, a movable piece 27f serving as a magnetic body is inserted into front ends of the energizing coils 27c and 27d so as to be movable forward and backward.

Therefore, under a stationary condition, the movable piece 27f is held by a magnetic force of a magnetic circuit formed by the permanent magnet 27e while the movable piece 27f is attracted. Moreover, by applying a direct current so that a magnetic field reverse to the magnetic field generated by a permanent magnet from terminals of the energizing coils 27c and 27d is generated, the magnetic field generated by the permanent magnet 27e is disabled and restraint of the movable piece 27f is canceled. Because the movable piece 27f is connected to a pin 28a fixed to the cancel lever 28, the cancel lever 28 also horizontally reciprocates synchronously with forward and backward movements of the movable piece 27f. The self-holding solenoid 27 is fixed to the disk tray 1 by a screw.

Then, though a tensile coil spring 31 is always hooked on and fixed to the cancel lever 28 so as to be energized leftward on FIG. 9, the spring force of the coil spring 31 must be smaller than the restraint force of the magnetic force by the permanent magnet 27e of the self-holding solenoid 27.

Symbol 29 denotes a lock lever always energized by a small spring force counterclockwise on FIG. 9, which has a function of engaging with a lock pin 32 fixed in the chassis case 10 to keep a loaded state of the disk tray 1. The lock lever having the above function frequently uses a lever integrally formed by a synthetic resin. However, as a disk drive decreases in thickness, the lock lever must be also decreased in wall thickness. In the case of the lock lever integrally formed by a synthetic resin, however, because deterioration of rigidity of the lever is a problem and the lever is frequently operated, the lever must have a sufficient durability.

Therefore, the present invention is constituted in accordance with the insert molding in which a resin main portion 29a includes a steel sheet mold material 29b. As shown in FIG. 9, the steel sheet mold material 29b is inserted into a front end and a portion most requiring rigidity is reinforced. Then, ends of the steel sheet mold material 29b are exposed from the synthetic resin portion, so that the slide contact resistance with the lock pin 32 lowers. Furthermore, an activation end 29c and a slope face (face to be driven) 29d for the forcible cancellation are formed at the rear end of the lock lever 29.

Figure 12:
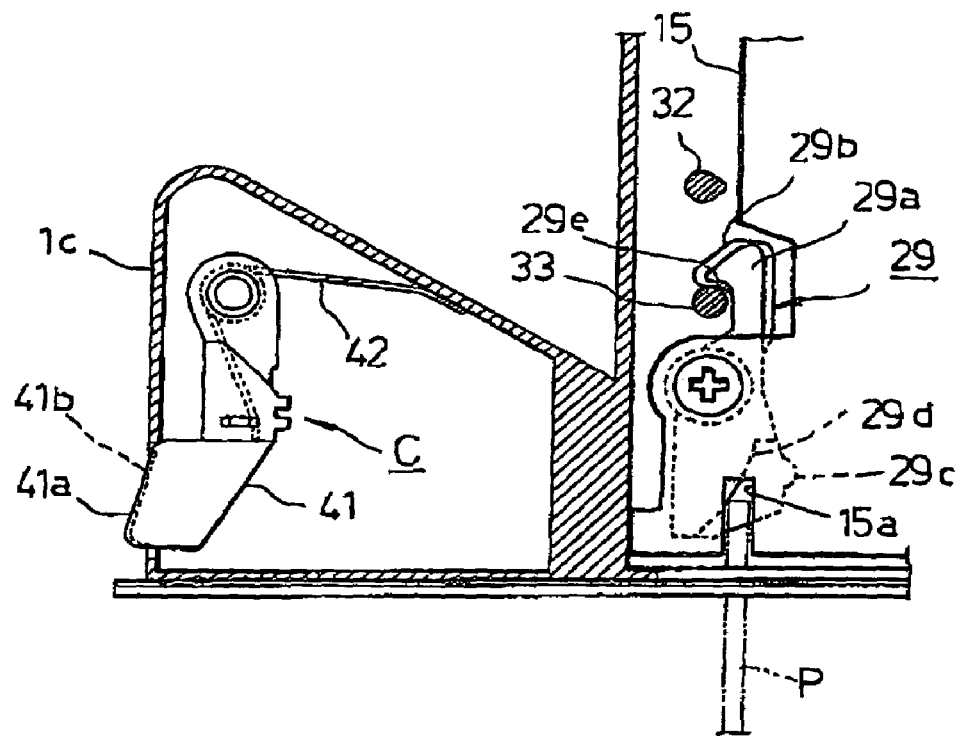
FIG. 12 is an illustration of an ejecting/locking mechanism and a side arm portion.

The forcible cancellation is performed to correspond to a problem that the disk tray 1 cannot be unloaded due to a trouble of a system while the disk tray 1 is loaded and the lock pin 32 engages with an angle portion 29e of the lock lever 29 as shown in FIG. 12. When such problem occurs, by properly inserting an operation pin P from a through-hole 8b of the bezel 8 and inserting the front end of the pin P while sliding the front end along the slope 29d of the lock lever 29, it is possible to rotate the lock lever 29 clockwise on FIG. 12, cancel the engagement with the lock pin 32, and take out the disk tray 1.

Figure 11:
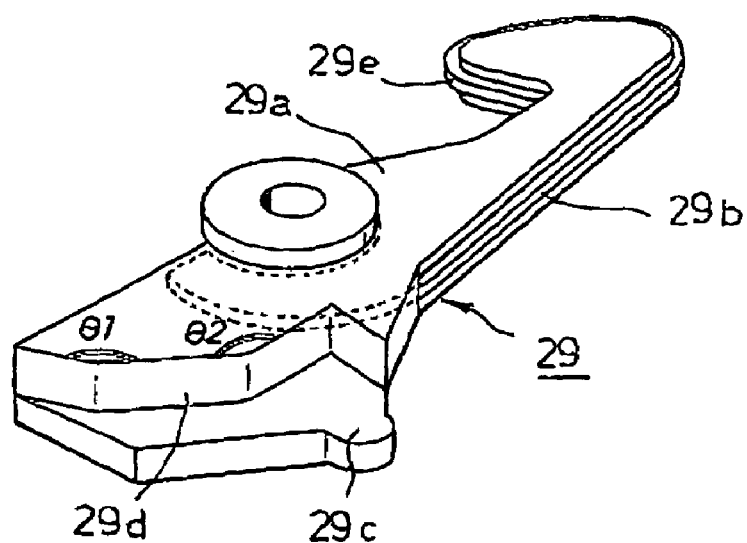
FIG. 11 is a perspective view of a lock lever of an ejecting/locking mechanism.

Because the slope 29d of the lock lever 29 is a portion formed by a synthetic resin, it is possible to optionally form a tilted curved surface or a slope provided with stepwise angles θ1 and θ2 as shown in FIG. 11 and optionally form a slope in which an operation feeling by the operation pin P is optimized. Moreover, as shown in FIG. 12, because a cutout 15a is formed on the bottom cover 15 at a position corresponding to the slope 29d of the lock lever 29, it is possible to lower the operation pin P as well as decrease the thickness of the bottom cover 15 up to the wall thickness, and the cutout 15a serves as a guide groove for the operation pin P. Thus, it is possible to control the free movement of the front end of the operation pin P at the time of forcible cancellation and improve the operability.

Then, the return lever 30 is activated when the activation end 30a of the lever 30 is pressed by a return pin 32, so that the self-holding solenoid 27 is returned to the steady state by operating the cancel lever 28 by an action end 30b. The return lever 30 can be returned to the original position (refer to FIG. 10B) by the tensile coil spring 34.

Conventionally, the return pin 32 is generally constituted by forming a metallic raw material into a cylinder and caulking and fixing an end of the cylinder to a base chassis. However, because the raw material is a metal and the sectional shape is cylindrical, the slide contact resistance with the return level 30 is large, the so-called click shock occurs when loading the disk tray 1 by a finger tip, and the operation feeling is deteriorated.

Figure 13:
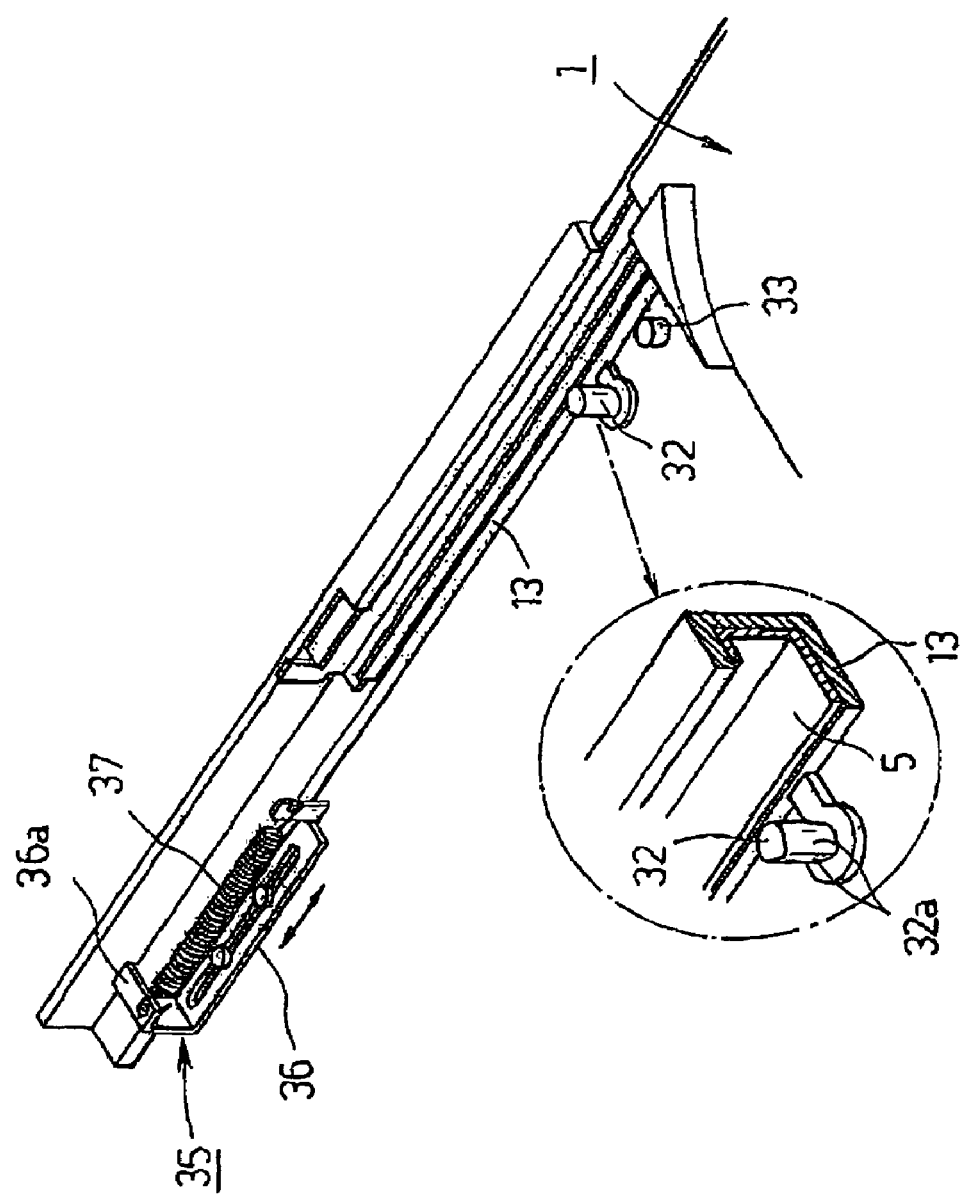
FIG. 13 is a perspective view for explaining a configuration of a lock pin.

Therefore, in the case of the present invention, the return pin 32 is integrally formed by a synthetic resin having a small slide contact resistance while extended from the holding rail 13 as shown in FIG. 13. Thereby, it is possible to form the return pin 32 so as to have an optional sectional shape. For example, it is possible to form a taper 32a on a contact face as shown by the embodiment and reduce the click shock by reducing a slide contact resistance. Moreover, it is possible to keep the direction of the taper face 32a constant by forming the return pin 32 integrally with the holding rail 13 made of a synthetic resin, product quality does not become unstable. Furthermore, by forming the return pin 32 integrally with the holding rail 13, it is unnecessary to separately form the return pin 32 and fix the pin 32 to the base chassis 1. Therefore, it is possible to reduce the working cost of this portion. In FIG. 13, symbol 33 denotes a lock pin which is fixed to the base chassis 11 through caulking. Moreover, the entire length of the return pin 32 is decreased so as not to contact with the activation end 30a of the return lever 30.

In FIG. 13, symbol 35 denotes a pop-up mechanism of the disk tray 1 in which a tensile coil spring 37 is stretched to a sliding member 36. Thereby, when the disk tray 1 advances leftward on FIG. 13, the rear end of the disk tray 1 contacts with an end 36a of the sliding member 36. When the disk tray 1 further advances and is locked at the original position, the tensile coil spring 38 extends and the spring force is accumulated. Therefore, when the disk tray 1 is ejected and unlocked, the spring force accumulated in the tensile coil spring 37 is instantaneously released and thereby, the disk tray 1 is ejected out and popped out.

Figure 10:
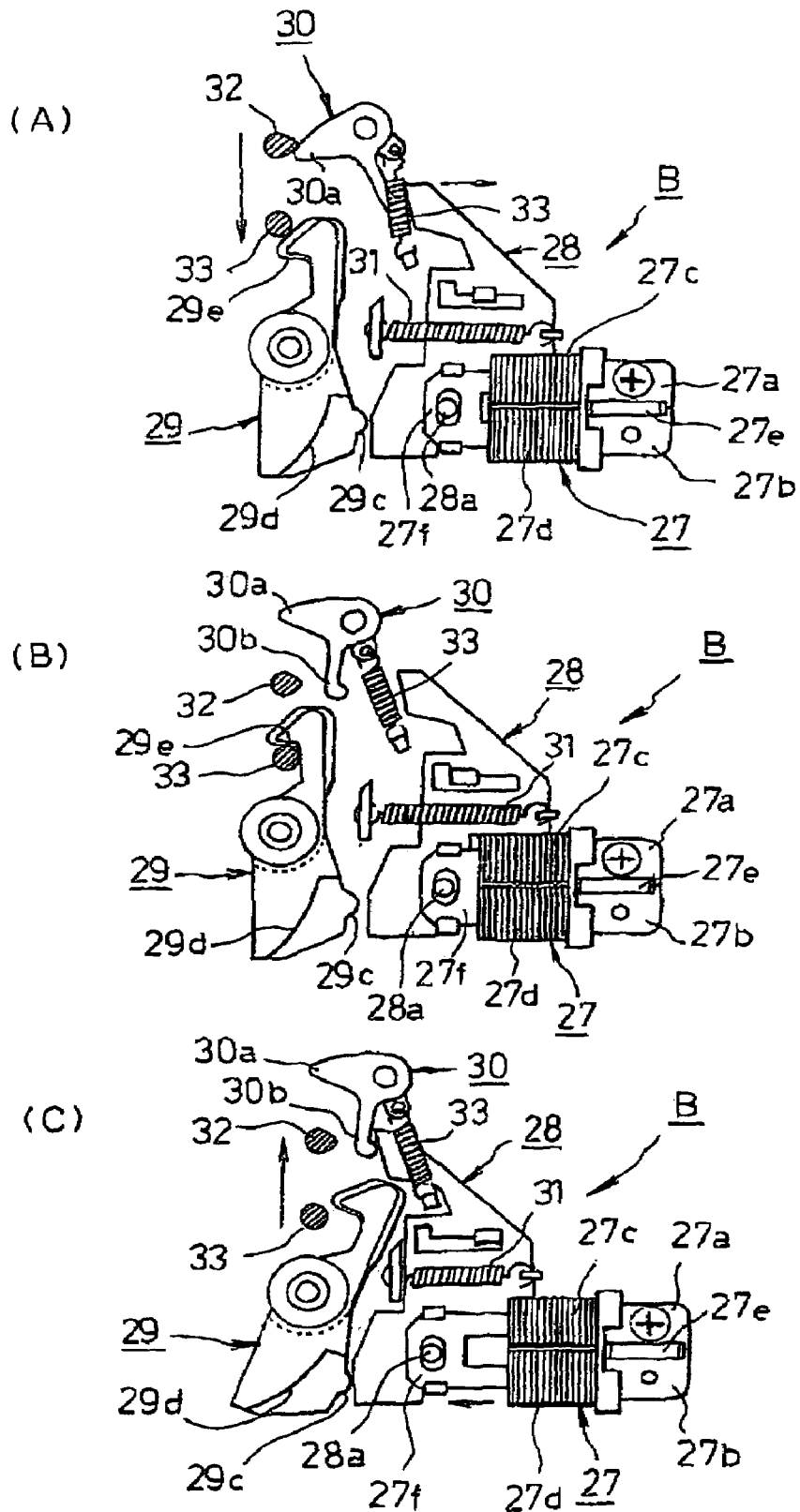
FIGS. 10A to 10C are illustrations showing a configuration and operation modes of an ejecting/locking mechanism.

Then, in the case of operation modes of the ejecting/locking mechanism B having the above configuration, the disk tray 1 to be loaded first advances, the return pin 32 contacts with the activation end 30a of the return lever 30 as shown in FIG. 10(A), and the return lever 30 rotates counterclockwise. Then, the action end 30b contacts with the front end of the cancel lever 28 to move the cancel lever 28 rightward in parallel. Accordingly, the tensile coil spring 31 is extended, and the movable piece 27f of the self-holding solenoid 27 is inserted into the energizing coils 27c and 27d, attracted by the magnetic force by the permanent magnet 27e and held.

Moreover, when the disk tray 1 further advances, the lock pin 33 comes in while pressing the top slope of the lock lever 29 and the lock pin 33 engages with the angle portion 29e of the lock lever 29 to complete locking of the disk tray 1.

However, when canceling the above locked state, that is, ejecting the disk tray 1 in order to unload the disk tray 1, a direct current is applied to the energizing coils 27c and 27d of the self-holding solenoid 27, thereby a magnetic field formed by the permanent magnet 27e is disabled, and restraint of the movable piece 27f is canceled. Therefore, the spring force accumulated in the tensile coil spring 31 is released, the cancel lever moves leftward in parallel and the lower end of the cancel lever 28 contacts with the activation end 29c of the lock lever 29 to rotate the lock lever 29 clockwise. Therefore, at this point of time, the engagement between the lock pin 33 and the angle portion 29e of the lock lever 29 is canceled and the disk tray 1 is popped out in accordance with the action of the tensile coil spring 37 of the pop-out mechanism 35.

Then, a configuration for improving the static stability of the disk tray 1 while loading the disk tray 1 and locking it in the chassis case 10 is described below. Though the disk tray 1 moves in the chassis case 10 forward and backward as described above, a small clearance is necessary for the support mechanism of the disk tray 1 in order to allow forward and backward movements of the disk tray 1. However, the clearance allows vibrations of the disk tray 1 and causes a read error or a write error when an impact is added.

Moreover, as a disk drive decreases in thickness, the distance between the clamp mechanism 2a and the inner wall surface of the cover chassis 12 decreases and a danger that they contact each other increases. Under such state, if the clamp mechanism 2a contacts with the inner wall surface of the cover chassis 12 due to any external cause while the disk drive operates, the rotational speed of the optical disk suddenly lowers to cause a problem such as a read error or write error. Therefore, the above-mentioned problem is a particularly important problem to be solved in decreasing the disk drive's thickness and improve its recording density.

Figure 3:
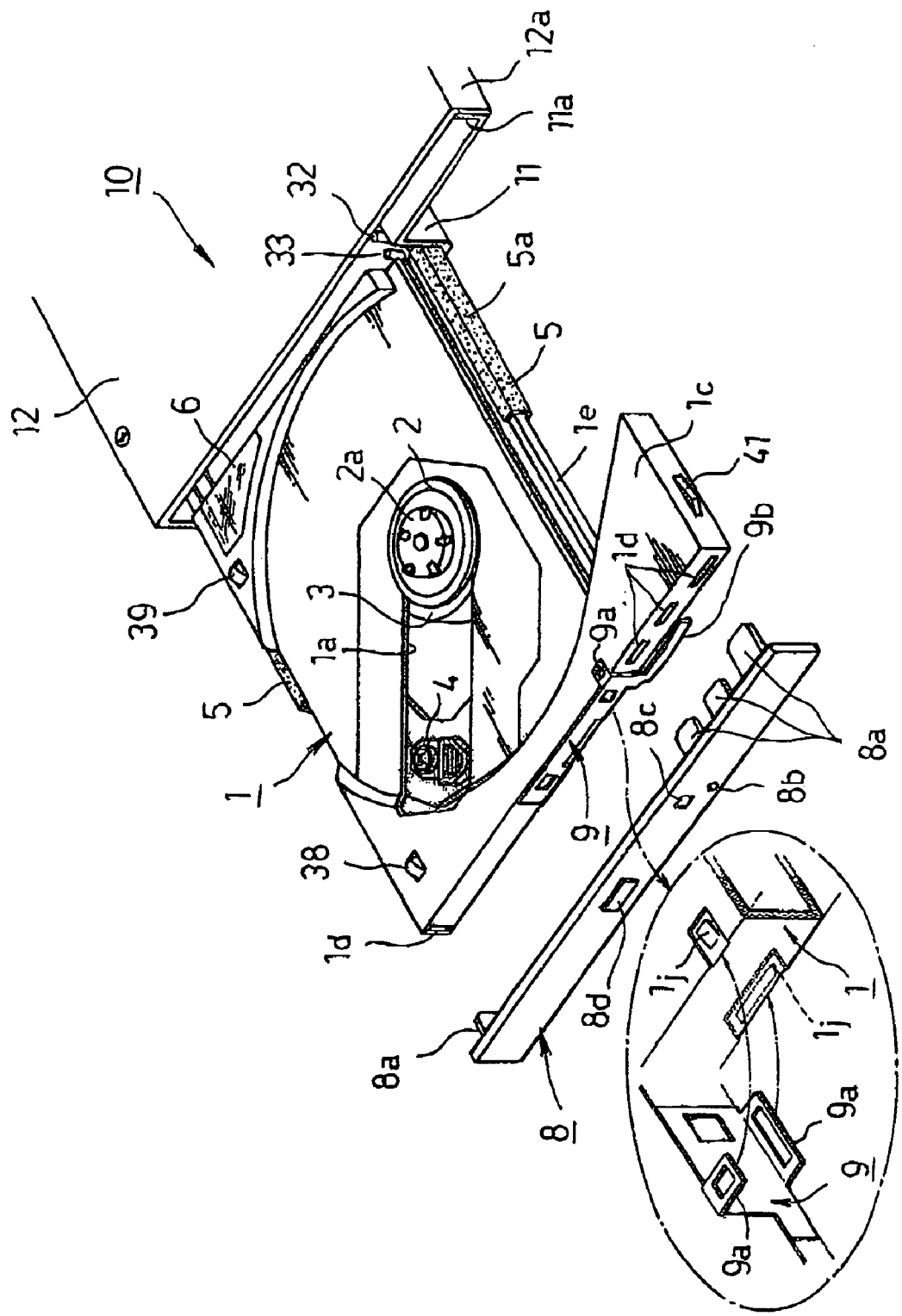
FIG. 3 is a perspective view showing a configuration of the disk tray.
Figure 14:
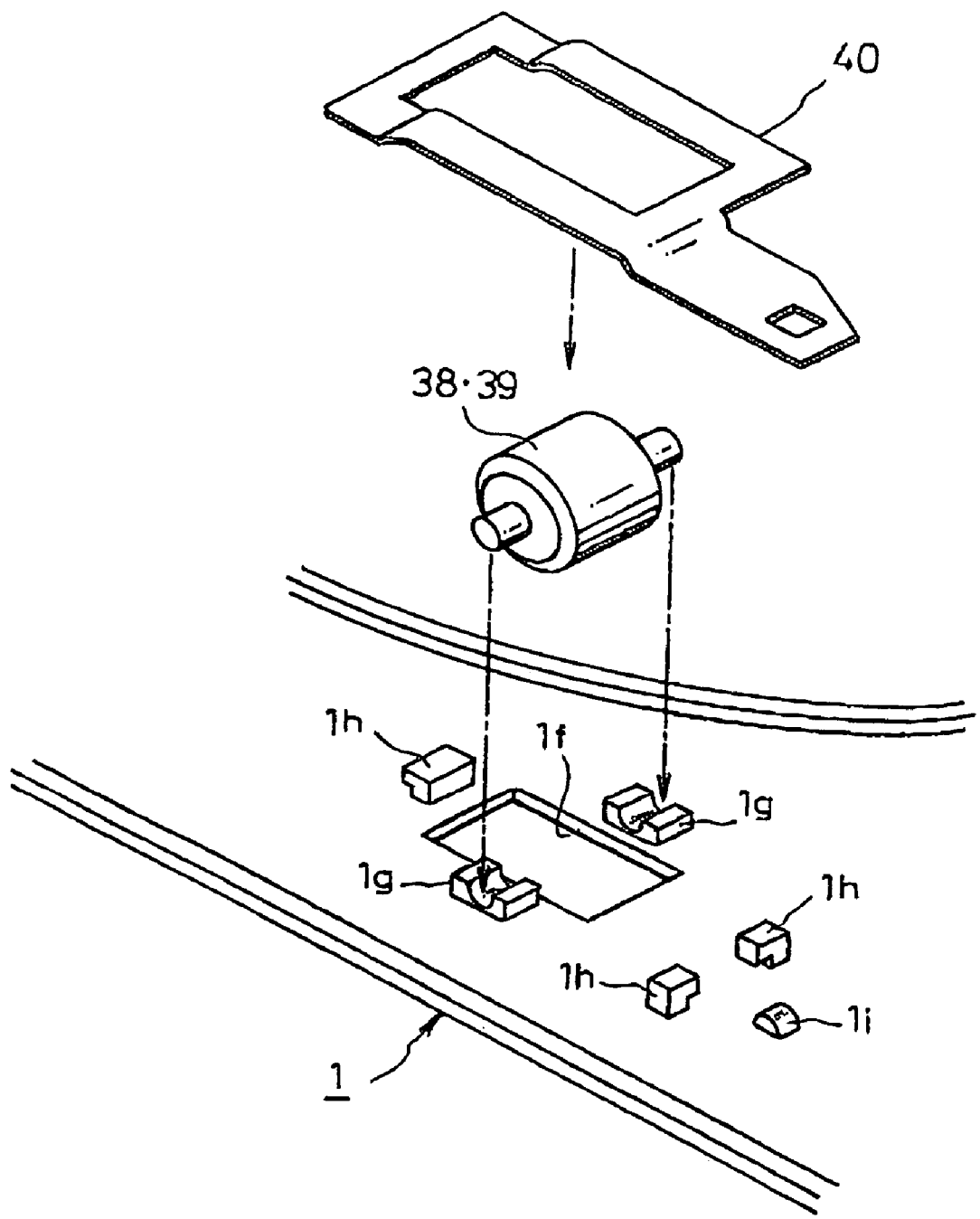
FIG. 14 is an exploded perspective view of a roller structure for generating static pressure.
Figure 15:
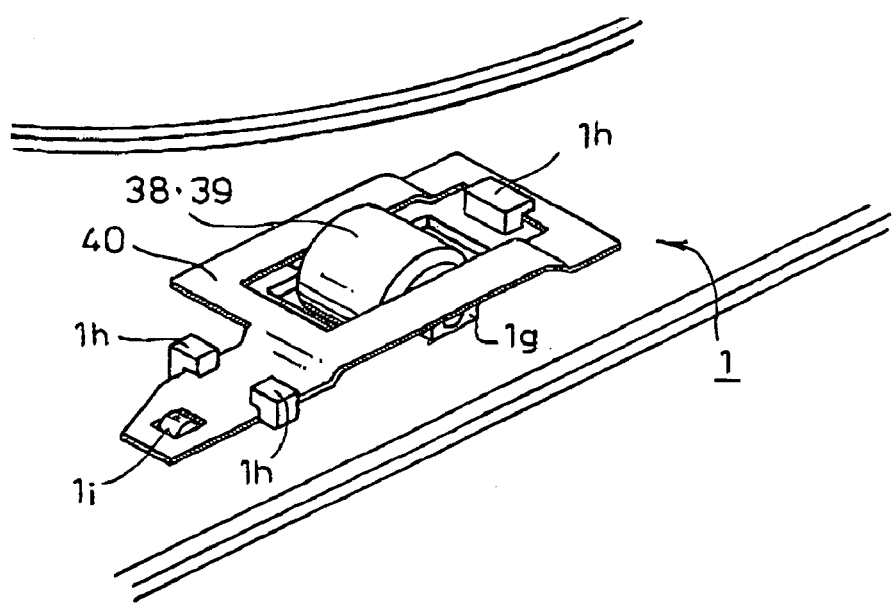
FIG. 15 is an assembled perspective view of a roller structure for generating static pressure.

Therefore, in the present invention, when the disk tray 1 is locked, static pressure is always generated in the disk tray 1. This configuration is described below. In FIGS. 1 to 3, rollers 38 and 39 are arranged in an essential portion of the disk tray 1 so as to expose parts of rolling contact surfaces of the rollers to the surface of the disk tray 1. In this configuration, as shown in FIG. 14, a bearing block 1g is formed at the both sides of a window hole 1f and an angle 1h and a positioning boss 1i for hooking and fixing a support plate 40 are formed in front of and behind the window hole 1f. Therefore, by setting shafts of the rollers 38 and 39 to the bearing block 1g and hooking and fixing the support plate 40 to the angle 1h, the rollers 38 and 39 are rotatably attached to the back face of the disk tray 1a as shown in FIG. 15.

Figure 16:
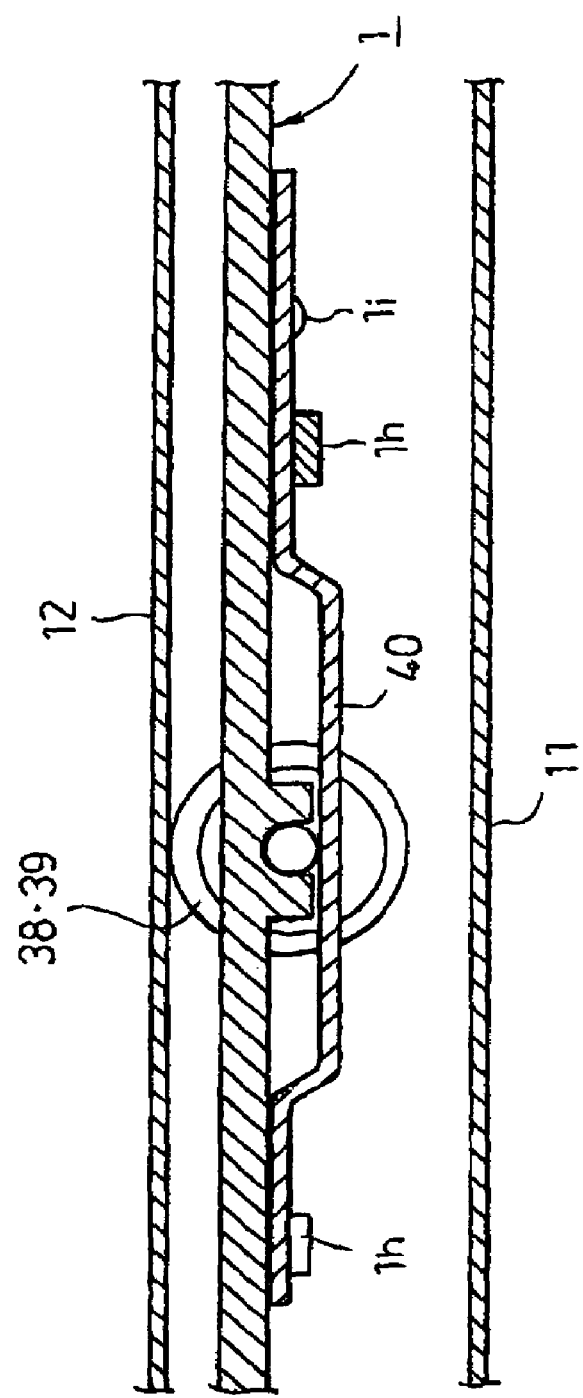
FIG. 16 is a sectional view showing a state in which a roller structure functions.
Figure 17:
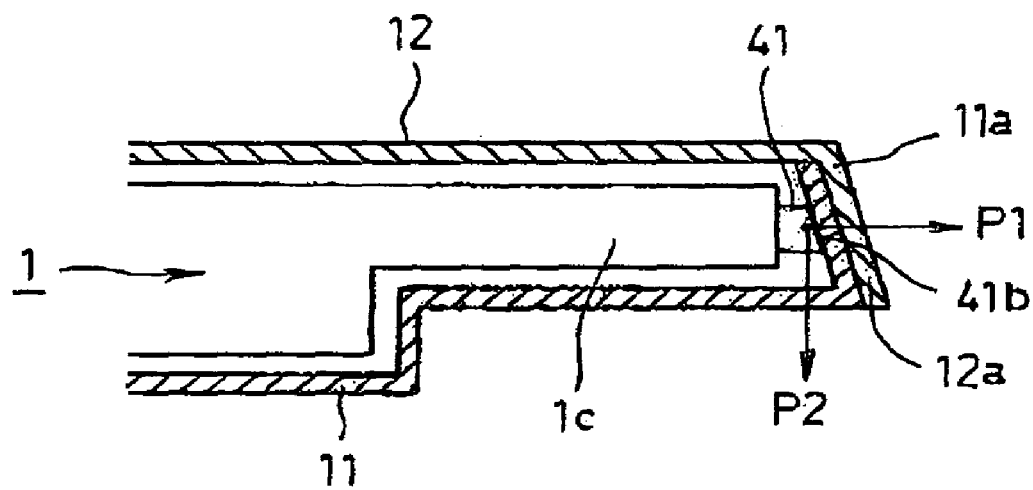
FIG. 17 is a sectional view for explaining a structure and function of the side arm.
Figure 18:
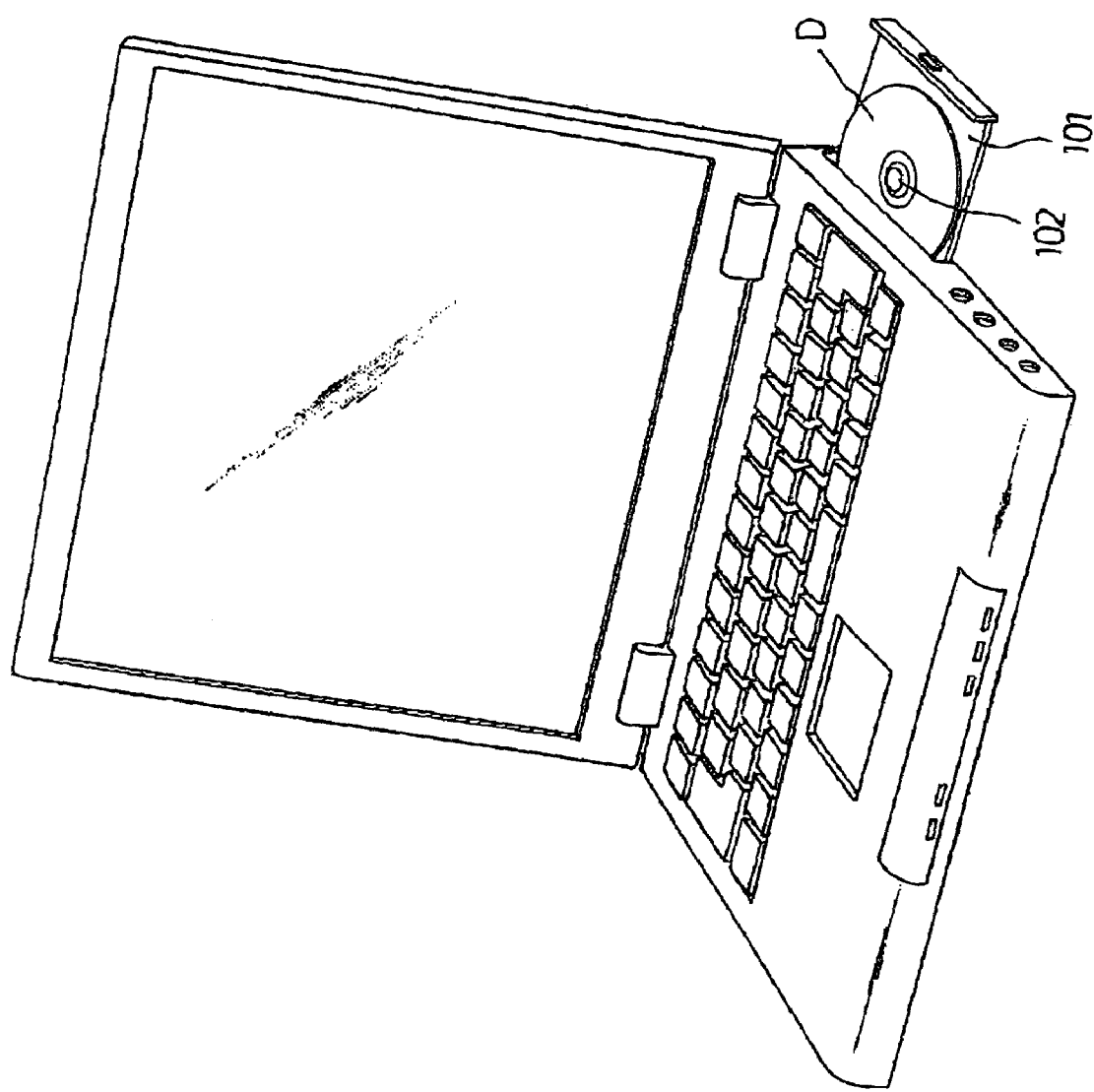
FIG. 18 is a perspective view showing the appearance of a general notebook PC.
Figure 19:
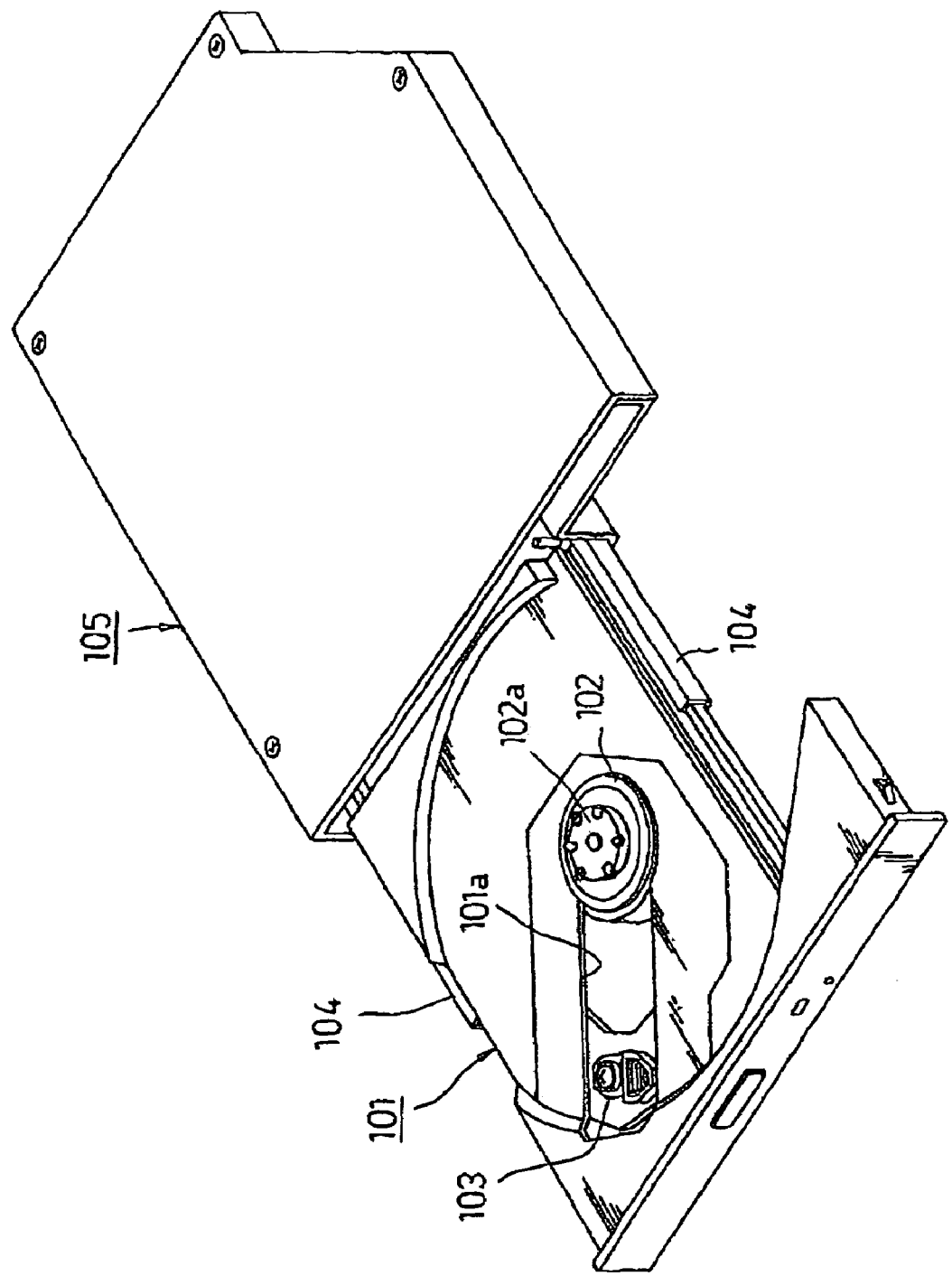
FIG. 19 is a perspective view showing the appearance of a conventional disk drive.
Figure 20:
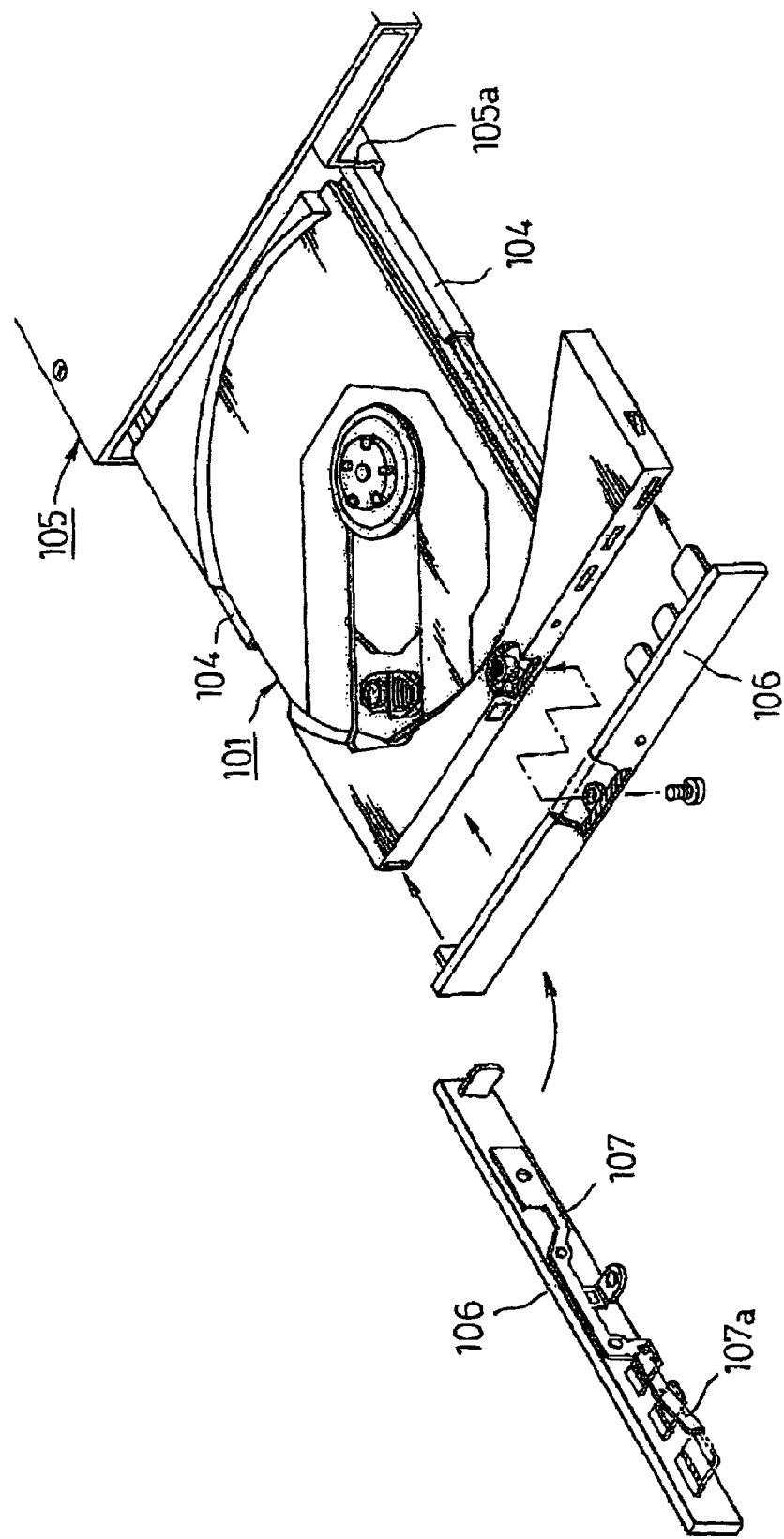

FIG. 16 shows an enlarged view of the state the rollers 38 and 39 thus arranged in the chassis case 10, in which rolling contact surfaces of the rollers 38 and 39 exposed to the surface of the disk tray 1 contact with the inner wall surface of the cover chassis 12. In this case, the support plate 40 supporting roller shafts functions as a leaf spring to press the rollers 38 and 39 against the cover chassis 12. Therefore, the cover chassis 12 functions as a reaction point at stop positions of the rollers 38 and 39 and static pressure is generated in the disk tray 1.

The configuration using the rollers 38 and 39 can be applied to a portion of one side of the disk tray 1 having a comparatively large margin. However, it is impossible to apply the above configuration using the rollers to a corresponding side of a disk drive having a standard appearance. However, to secure the static stability of the disk tray 1, it is desirable that static pressure is generated at the both sides of the disk tray 1. Therefore, the present invention solves the above problem by improving a slider mechanism to be built in a side arm.

In FIG. 12, the slider mechanism C built in the side arm 1c is constituted by a slider 41 whose one end is pivoted, which is energized clockwise on FIG. 12 by a torsion coil spring 42, and whose front end 41a slides. Moreover, a downward slope 41b extending from the upper part to the lower part is formed at a side face of the front end 41a of the slider 41. A sidewall 11a of the base chassis 11 and a sidewall 12a of the cover chassis 12 with which the front end 41a of the cover chassis 12 slides and contacts are formed at an angle coinciding with the tilt angle of the slope 41b of the front end 41a.

Since the slider mechanism C is constituted as described above, when setting the disk tray 1 in the chassis case 10, the front end 41a of the slider 41 slidably contacts with the sidewall 11a of the space chassis 11 by their slopes. Under this state, because the slider 41 is energized (P1) outward by the torsion coil spring 42, it is possible to keep a stable state in the horizontal direction of the disk tray 1, which is the original function of the slider 41, a downward component force (P2) is generated due to the slide contact between the slopes, and the plane-directional stable state of the disk tray 1 is kept because the component force serves as static pressure.

Figure 21:
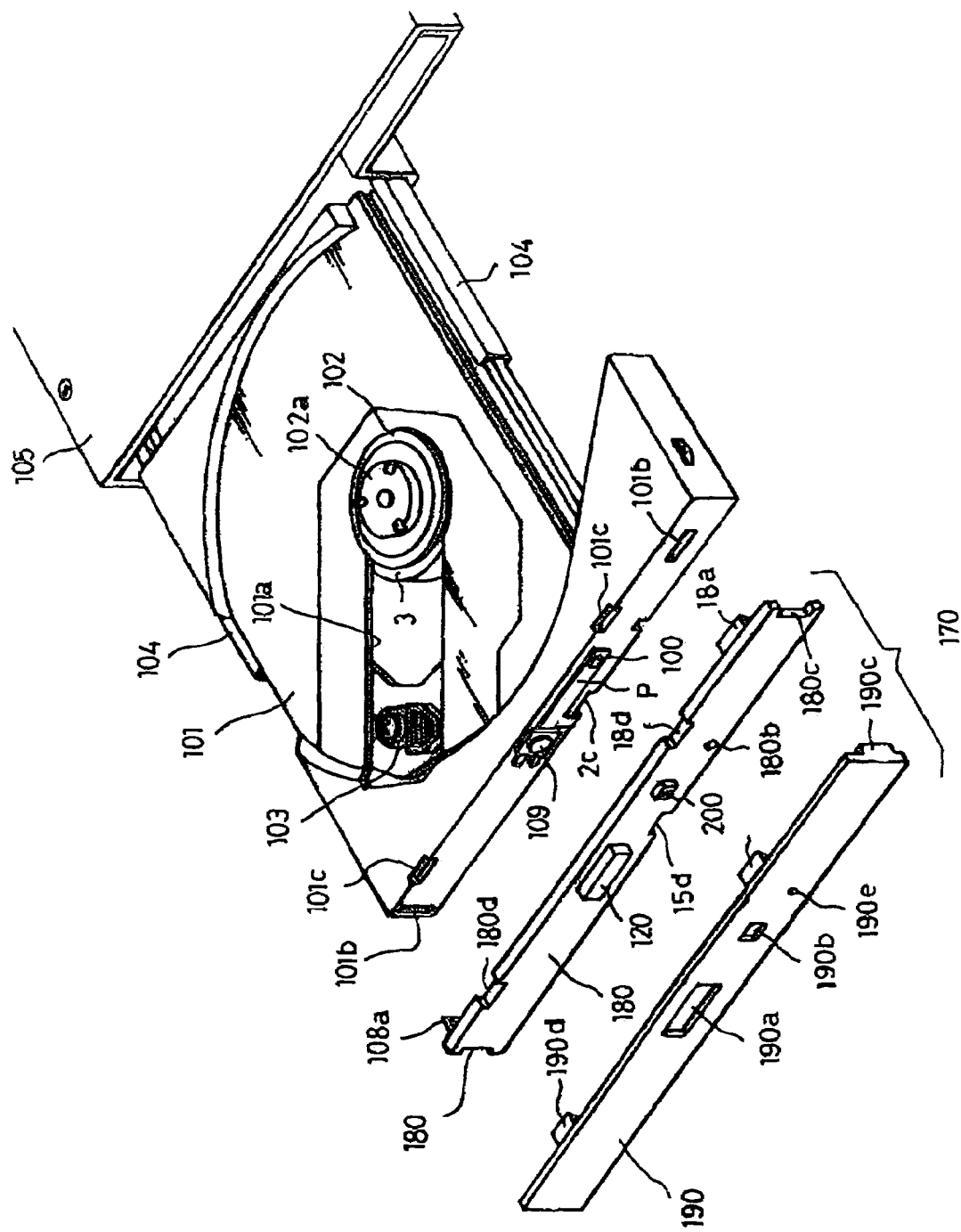
FIG. 21 is an exploded perspective view of a second embodiment of the present invention.
Figure 22:
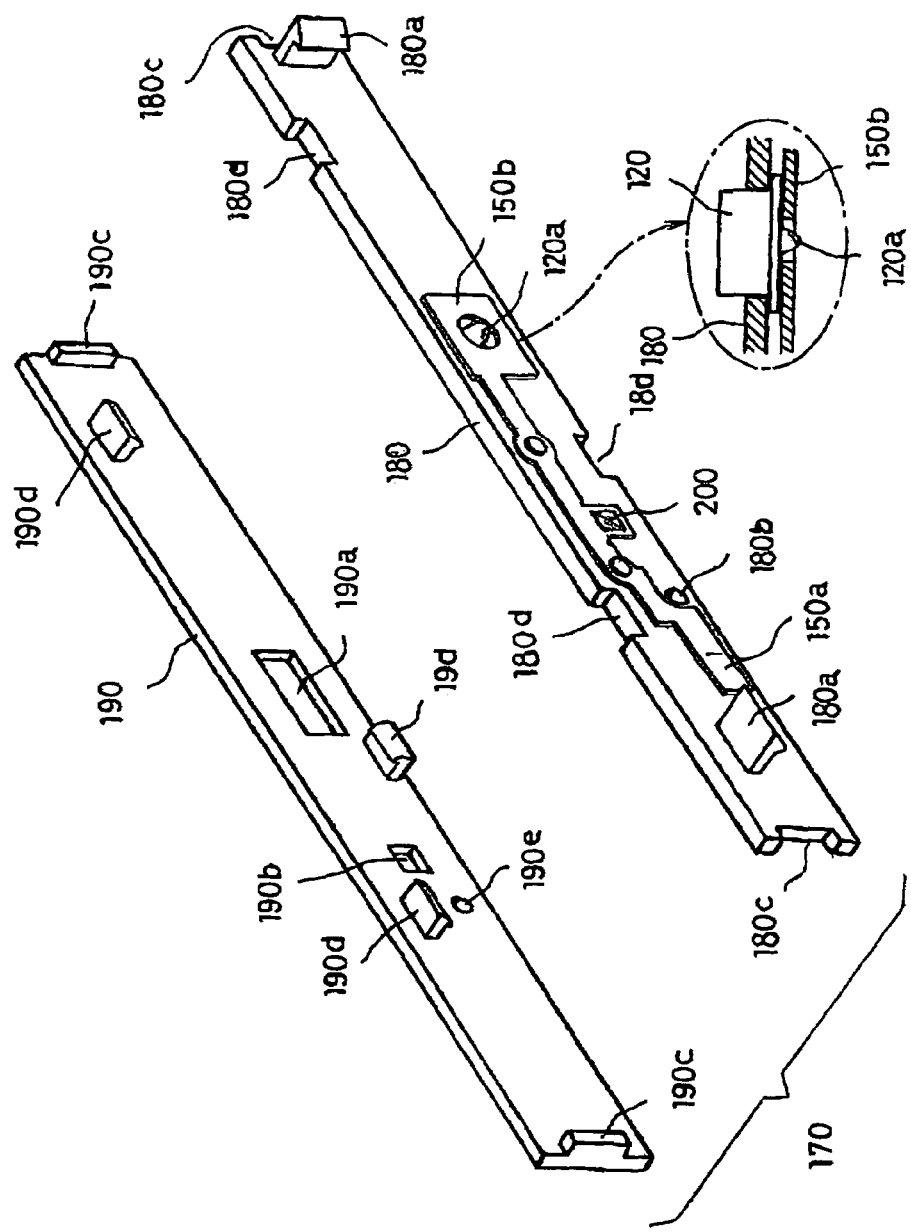
FIG. 22 is a perspective view showing a configuration of an essential portion of the second embodiment of the present invention.

FIG. 21 is an exploded perspective view for explaining a configuration of a second embodiment of the present invention. As shown in FIG. 21, a bezel 170 is constituted by an inner bezel 180 and an cuter bezel 190. The inner bezel 180 and the outer bezel 190 are integrated and attached to the front end face of the disk tray 101. As shown in FIG. 22, a securing nail 180a for fixing the inner bezel 180 to the disk tray 101 is formed at essential portions of the inner bezel 180 and a securing through-hole 101b corresponding to each securing nail 180a is formed at the front end face of the disk tray 101. By inserting the securing nails 180a into the securing through-holes 103b, the inner bezel 180 is fixed to the front end face of the disk tray 101.

The earth plate 150 is fixed to the center of the back of the inner bezel 180 through thermal caulking and the push button 120 is set to the back of the end 150b of the earth plate 150 as shown by an enlarged view. Moreover, a transparent lens 200 is fixed to the inner bezel 180 in an embedded state and a through-hole 180b for forcible cancellation is formed on the inner bezel 180. Furthermore, a concave cutout 180c is formed at the both ends of the inner bezel 180 and a concave cutout 180d is formed at essential portions of upper and lower end margins, so that an outer bezel 190 to be described later can be fixed.

Then, the outer bezel 190 is formed like a plate so as to follow the outline of the inner bezel 180, on which a window hole 190a passing through the head of the push button 120 and a window hole 190b passing through the transparent lens 200 are formed. Moreover, a convex portion 190c for stabilizing a fixed state by being engaged to the concave cutout 180c of the inner bezel 180, a securing nail 190d fastened to a concave cutout 180d of the inner bezel 180, and a through-hole 190e communicating with the through-hole 180b of the inner bezel 180 are formed at the both ends of the outer bezel 190.

To built in the bezel 170 of the second embodiment constituted as described above to the front end face of the disk tray 101, the securing nail 180a of the inner bezel 180 is first inserted into the securing through-hole 101b formed at the front end face of the disk tray 101 to fix the undercut portion of the securing nail 180a is secured in the securing through-hole 101b to be fixed. Then, the undercut portion of the securing nail 190d is secured to the concave cutout 180d of the inner bezel 180 while fitting the convex portions 190c at the both ends of the outer bezel 190 to the concave cutouts 180c at the both ends of the inner bezel 180 to fix the outer bezel 190 to the inner bezel 180.

Figure 23:
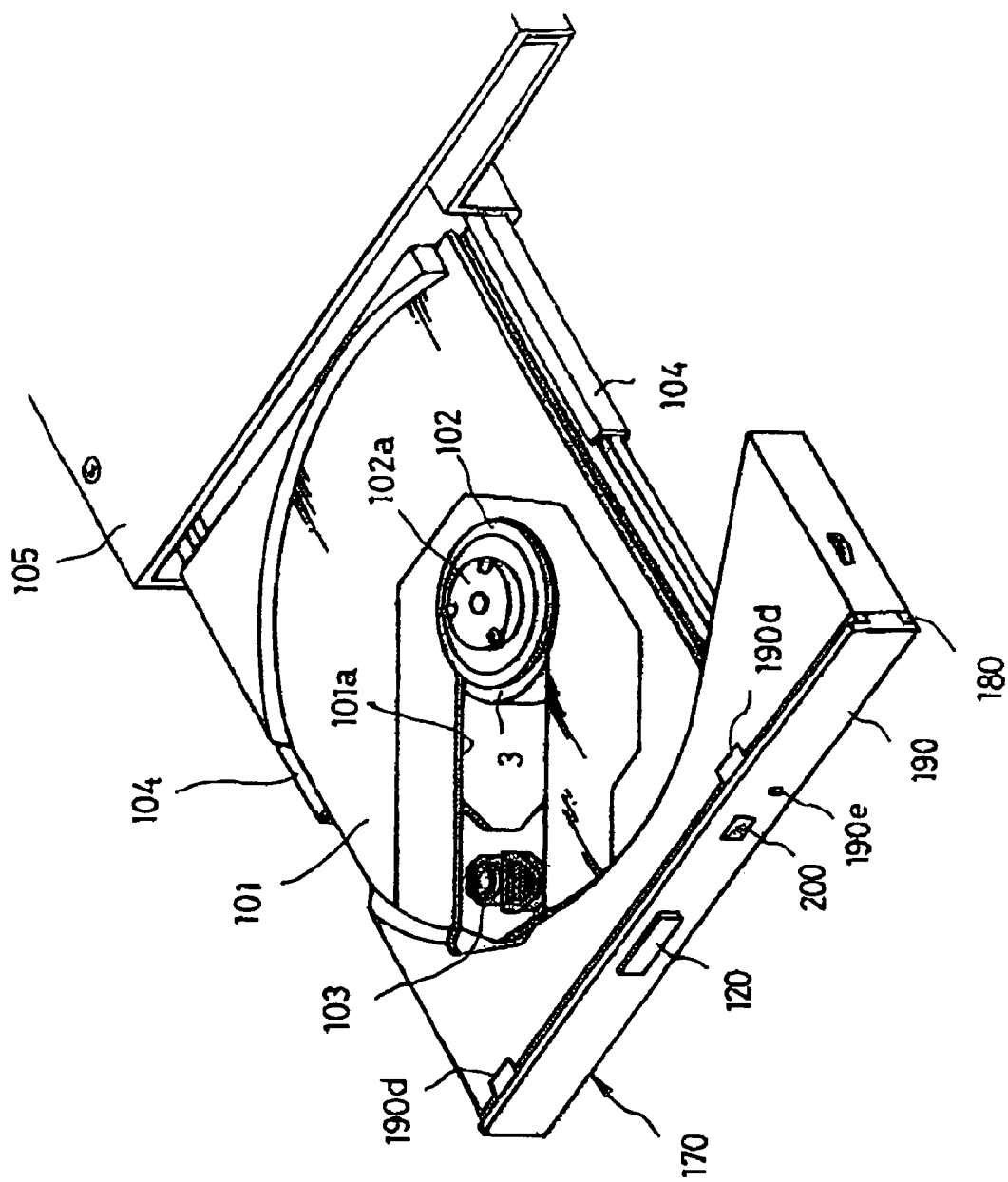
FIG. 23 is a perspective view of an assembled state of the second embodiment of the present invention.
Figure 24:
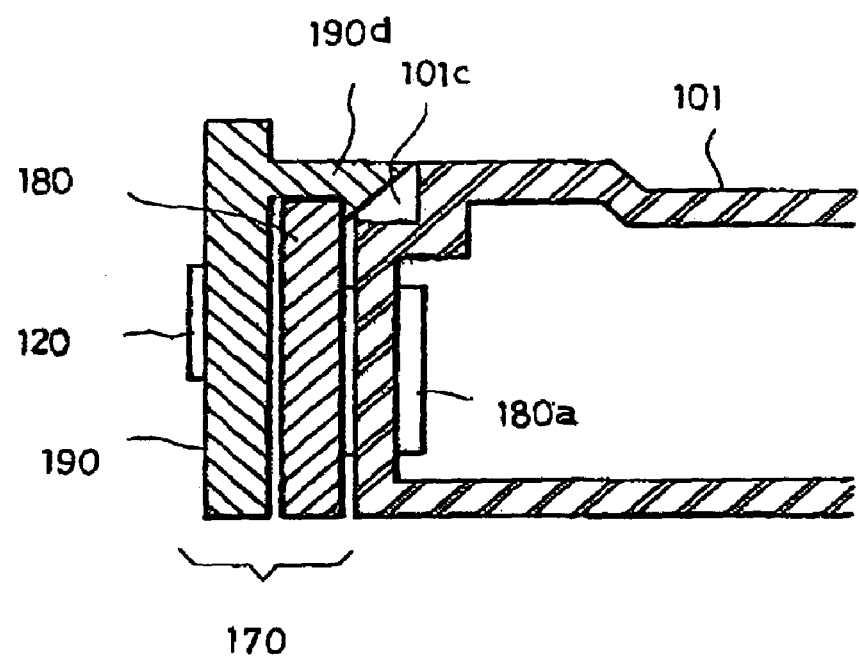
FIG. 24 is a sectional view of an assembled state of the second embodiment of the present invention.

When the bezel 170 is thus mounted to the front end face of the disk tray 101 as shown in FIG. 23, the head of the push button 120 and the front face of the transparent lens 200 appear on the surface of the outer bezel 190 and the disk tray 101 and the bezel 170 are integrated. In this case, because a tip of the securing nail 190d of the outer bezel 190 drops into a concave portion 101c formed on the disk tray 101, the flatness of the surface of the disk tray 101 is not deteriorated. FIG. 24 shows a sectional view of the attached state of the bezel of the first embodiment.

Figure 25:
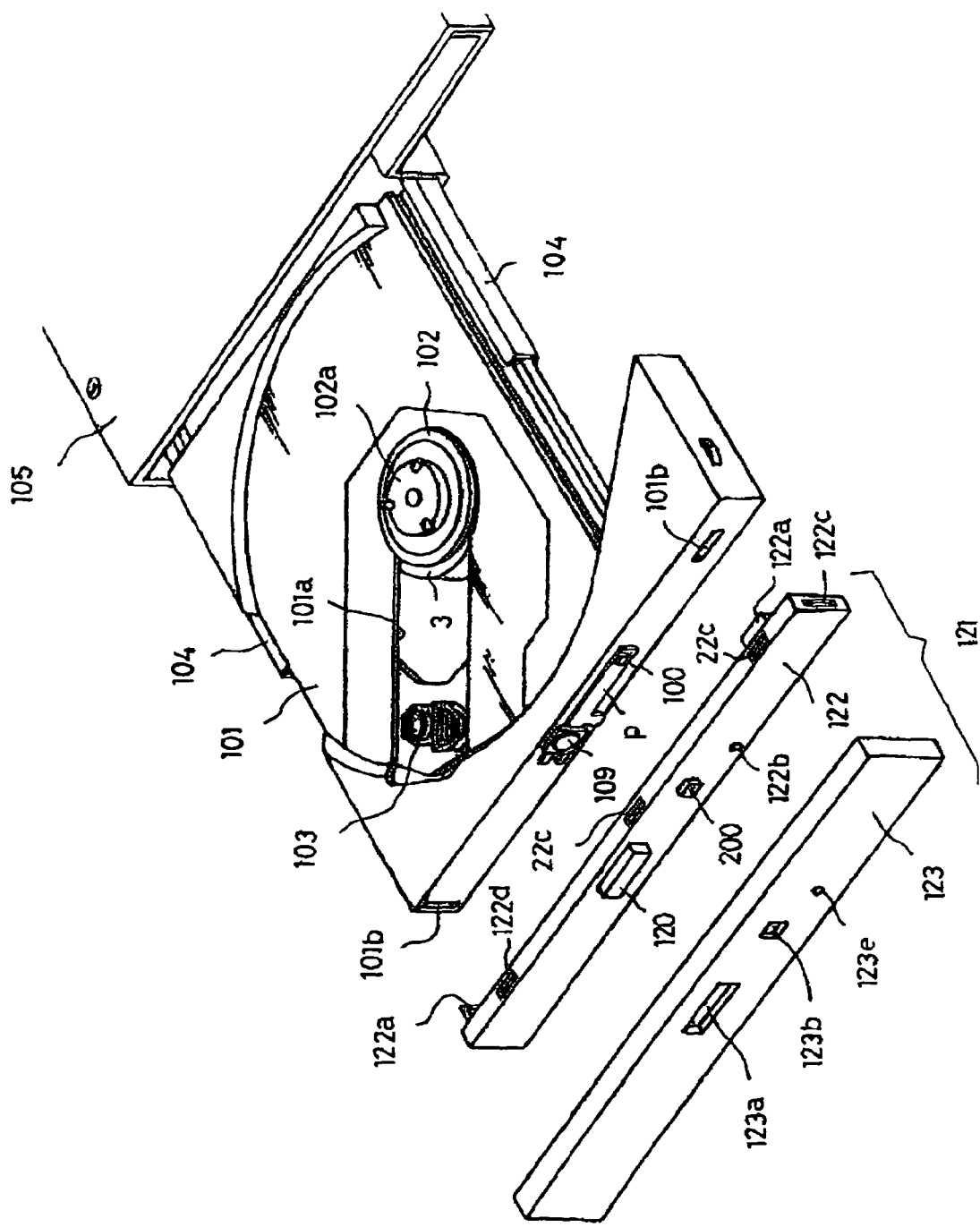
FIG. 25 is an exploded perspective view of a third embodiment of the present invention.

FIG. 25 is an exploded perspective view for explaining a configuration of a third embodiment. In the case of a bezel 121 of the embodiment, a securing nail 122a for fixing an inner bezel 122 to the disk tray 101 is formed at essential portions of the inner bezel 122 similarly to the case of the second embodiment and the inner bezel 122 is fixed to the front end face of the disk tray 101 by inserting the inner bezel 122 into the securing through-hole 101b at the front end face of the corresponding disk tray 101.

Figure 26:
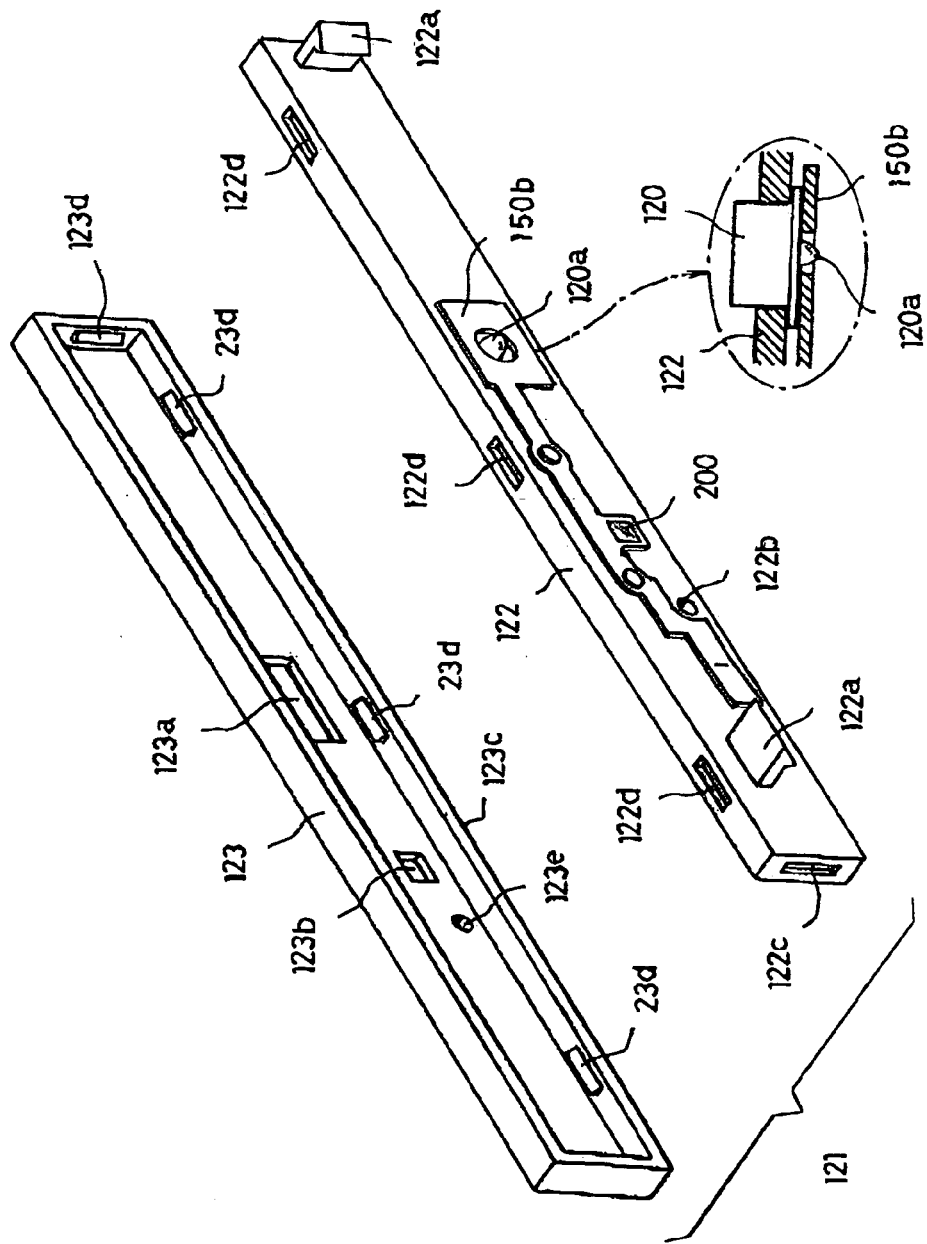
FIG. 26 is a perspective view showing a configuration of an essential portion of the third embodiment of the present invention.

The earth plate 150 is fixed to the center of the back face of the inner bezel 122 through thermal caulking as shown in FIG. 26 and the push button 120 is set to the back of the end 150b of the earth plate 150 as shown by an enlarged view. Moreover, the transparent lens 200 is fixed to the inner bezel 122 in a embedded state and a through-hole 122b for forcible cancellation is formed on the inner bezel 122. Furthermore, a securing concave portion 122c is formed at the both ends of the inner bezel 122 and a securing concave portion 122d is formed at essential portions of the upper and lower end margins of the inner bezel 122, so that an outer bezel 123 to be described later can be fitted.

The outer bezel 123 is formed like a shallow pan for enwrapping the inner bezel 122 and a window hole 123a passing through the head of the push button 120 and a window hole 123b passing through the transparent lens 200 is formed. Moreover, a securing nail 123d is vertically molded at a position corresponding to the securing concave portion 122d formed on the inner bezel 122 on the outer periphery margin 123c of the outer bezel 123 and a through-hole 123e communicating with the through-hole 122b of the inner bezel 122 is formed.

To built in the bezel 121 of the third embodiment constituted as described above to the front end face of the disk tray 101, the securing nail 122a of the inner bezel 122 is first inserted into the securing through-hole 101b formed on the front end face of the disk tray 101 and the undercut portion of the nail 122a is secured in the securing through-hole 101b and fixed. Then, the inner bezel 122 enters the outer bezel 123 by attaching the opening of the outer bezel 123 to the inner bezel 122 so as to cover it and moreover, pressing the outer bezel 123 from its front face and the securing nail 123d engages with the securing concave portion 122d, and the outer bezel 123 is fitted to the inner bezel 122.

Figure 27:
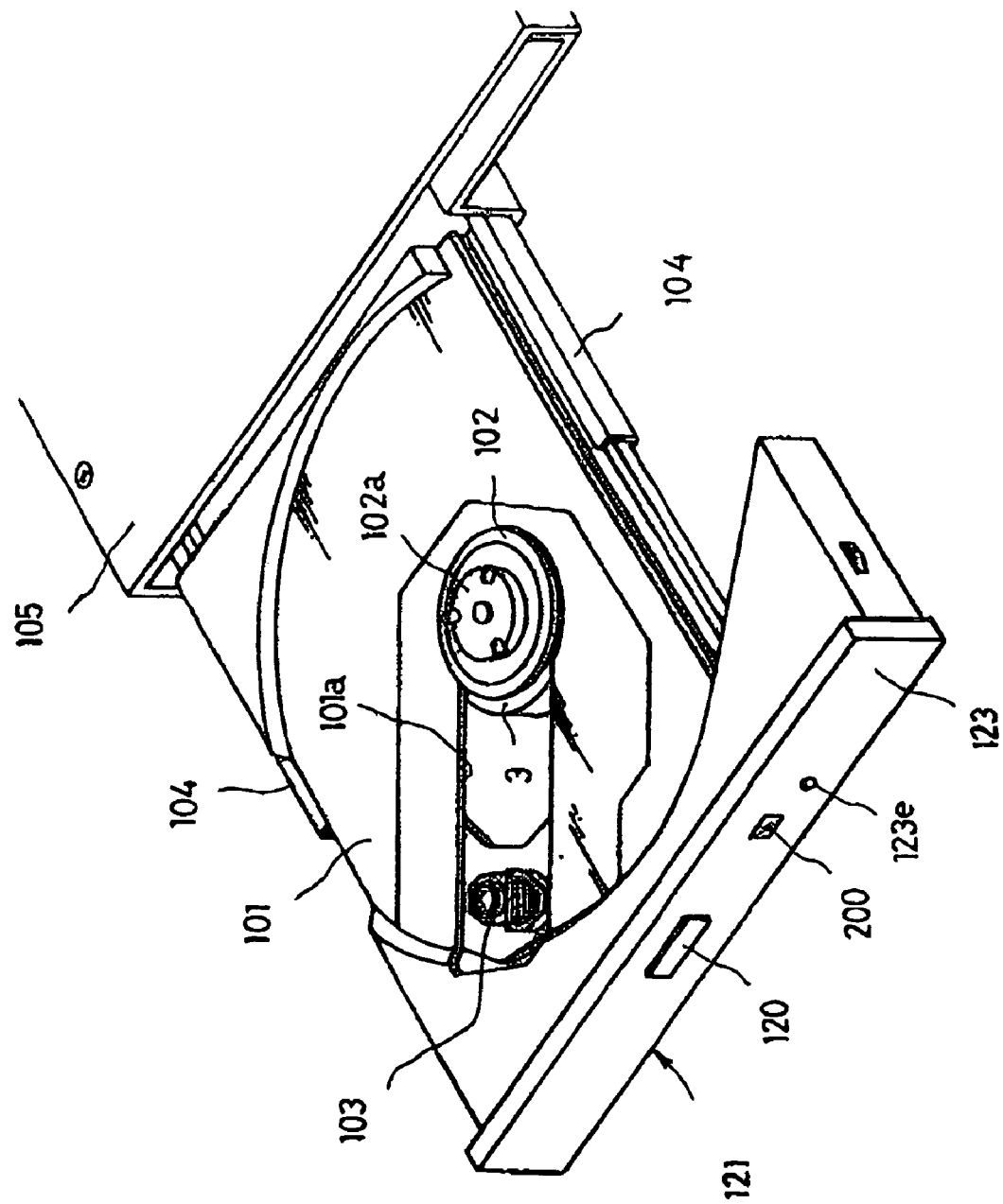
FIG. 27 is a perspective view of an assembled state of the third embodiment of the present invention.
Figure 28:
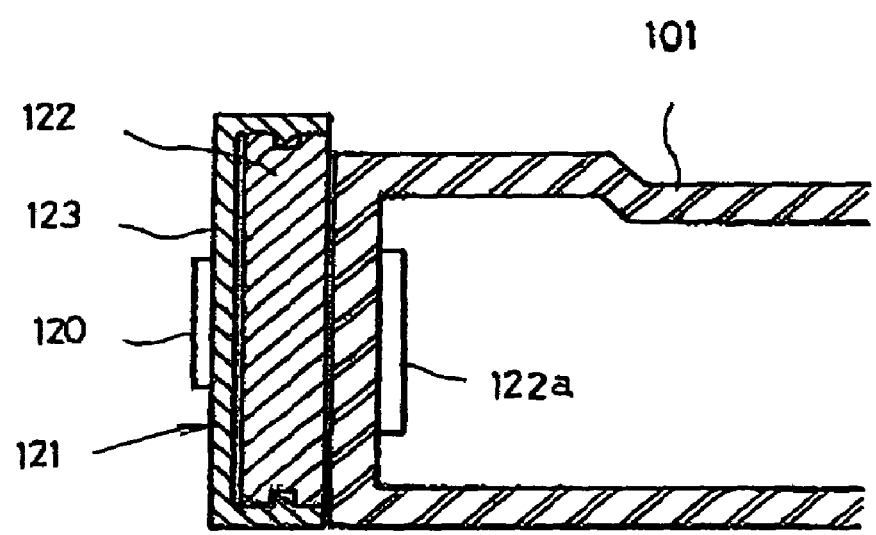
FIG. 28 is a sectional view of the assembled state of the third embodiment of the present invention.

Thus, when the bezel 121 is fixed to the front end face of the disk tray 101 as shown in FIG. 27, the head of the push button 120 and the front face of the transparent lens 200 appear on the surface of the outer bezel 123 and the disk tray 101 and bezel 121 are integrated. FIG. 28 shows a sectional view of the attached state of the bezel of the third embodiment.

Figure 29:
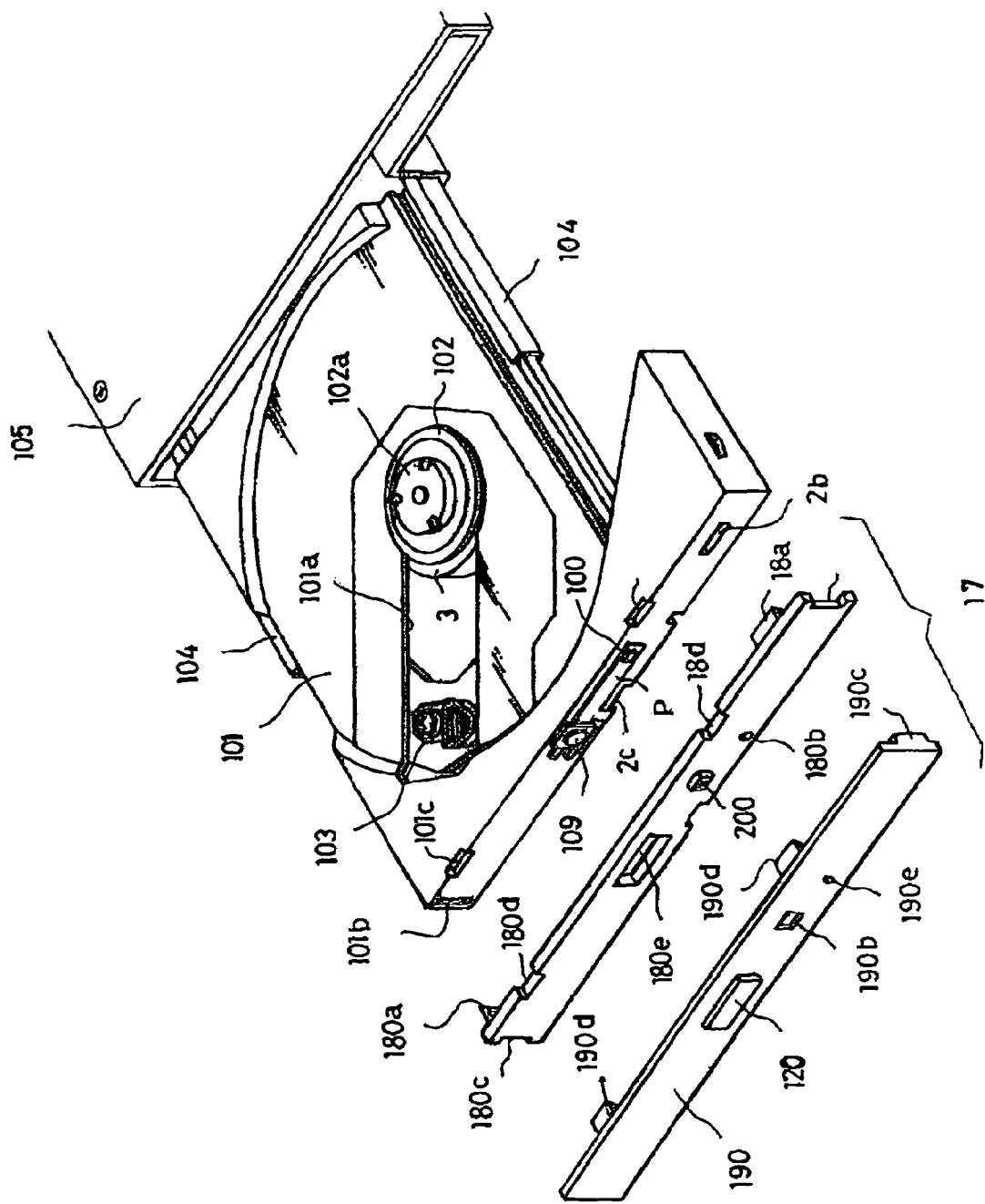
FIG. 29 is an exploded perspective view of an example of constituting the present invent by modifying it.
Figure 30:
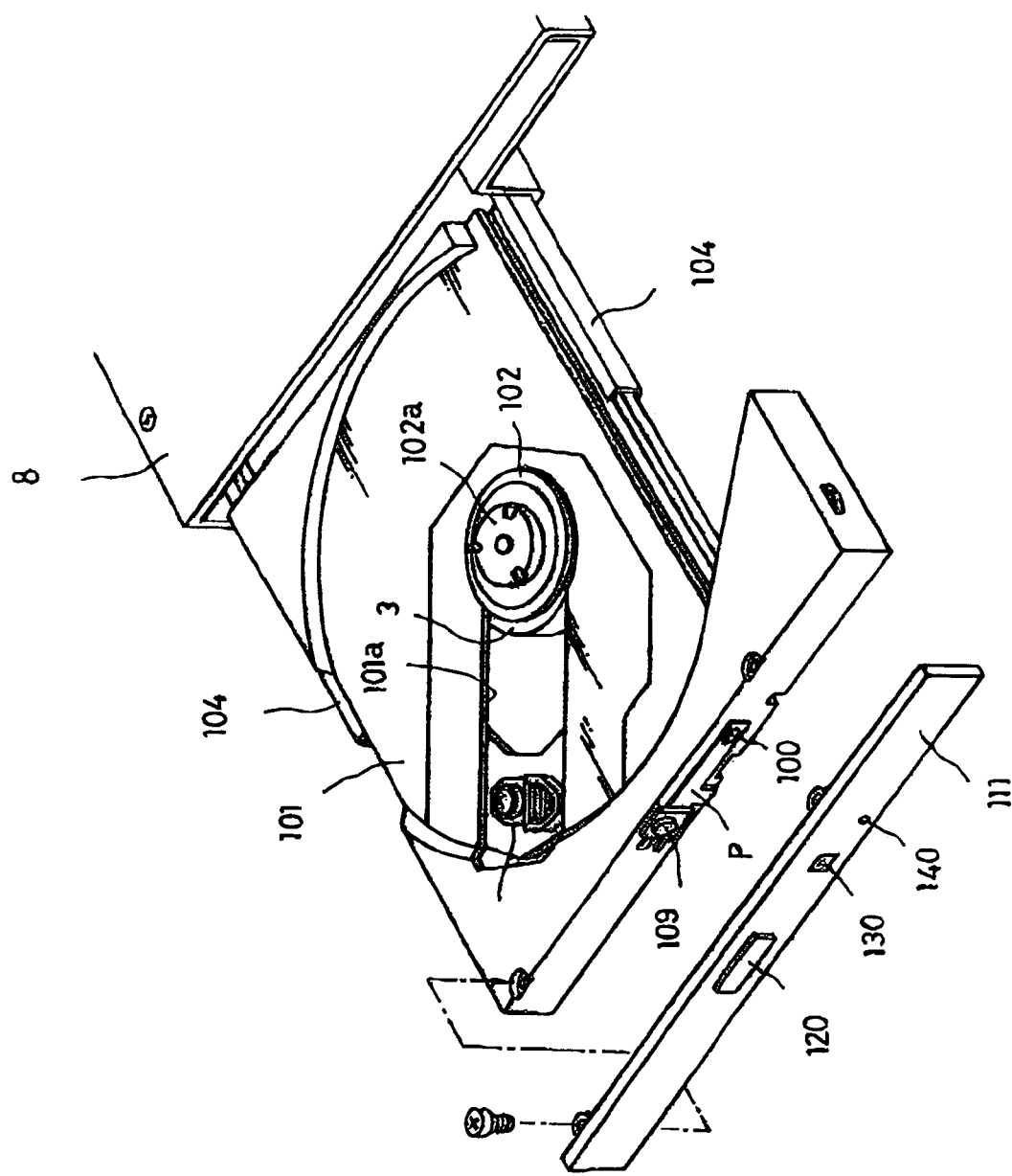
FIG. 30 is an exploded perspective view of a bezel portion of a conventional disk drive.
Figure 31:
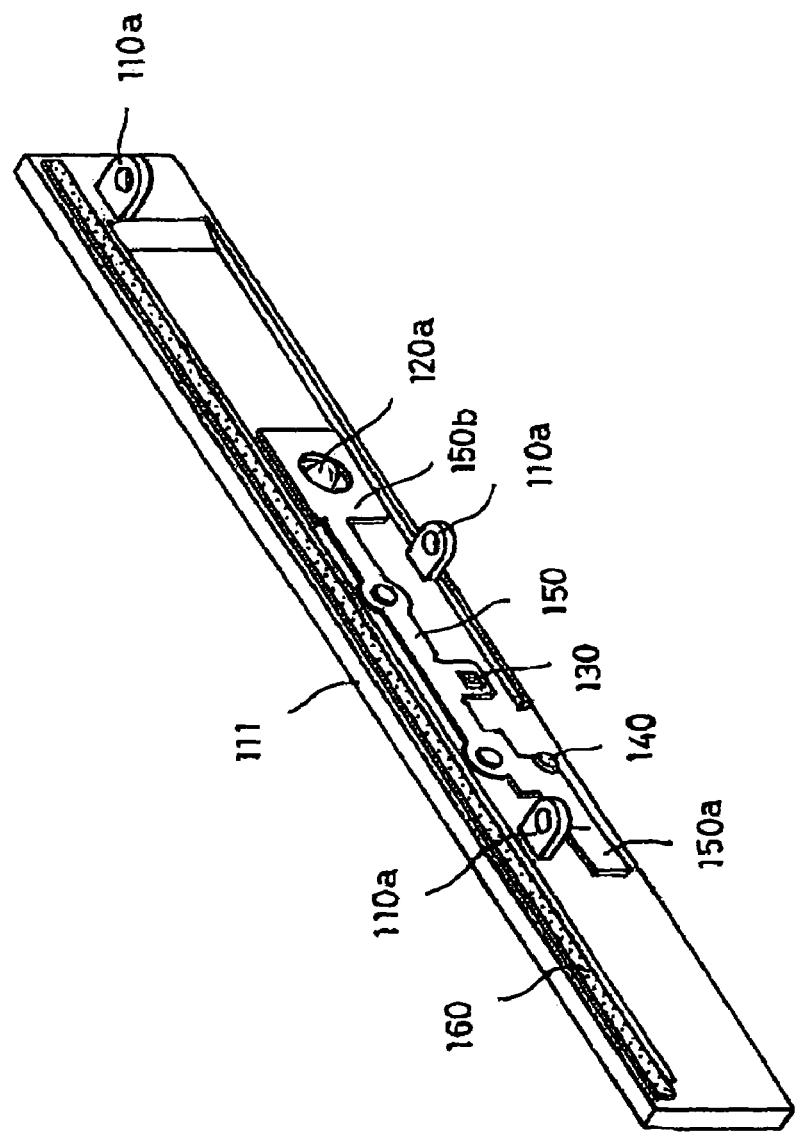
FIG. 31 is a perspective view showing a configuration of a bezel of the conventional disk drive.

Thus, the second and third embodiments of the present invention respectively use the configuration in which the push button is attached to the inner bezel and the window hole is formed on the outer bezel so as to expose the head of the push button to the surface of the outer bezel. However, as shown in FIG. 29, it is also allowed to attach the push button 120 to the outer bezel 190 and form the window hole 180e on the inner bezel, so that the push button 120 operates the microswitch 109 through the window hole 180e of the inner bezel.

In the case of the second and third embodiments of the present invention, the inner bezel and the outer bezel are fixed by structural means. However, it is also allowed to adhere the inner bezel with the outer bezel by screws or an adhesive. Moreover, though the outer bezel is fixed to the inner bezel, it is also possible to fix the outer bezel to the disk tray.

As described above in detail, according to the configuration of the disk tray of the present invention, the disk drive is finished by previously mounting the earth plate to the front end face of the disk tray. Therefore, the user receiving the disk drive can omit the processing for integrating the earth plate. Thus, manufacture and attachment of the bezel are simplified. Moreover, because element components to be built in the bezel are attached to the inner bezel and the inner bezel is fixed to the front end face of the disk tray, it is possible to simply constitute the outer bezel. Furthermore, because element components are attached to the inner bezel, it is possible to supply the disk drive to unspecified users without lacking in specifications required to the disk tray for keeping a desired performance. Therefore, even if the user who received the disk drive with the already fixed inner bezel mounts an independently manufactured outer bezel, it is possible to keep a stable quality without deteriorating the performance of the disk drive, reduce the manufacture cost, and supply the disk drive having a high versatility.

What is claimed is:

1. A disk drive comprising:
a chassis case,
a disk tray capable of moving between a loading position inside the chassis case and an unloading position outside the chassis case while supporting a recording medium,
a bezel attached to the disk tray so as to cover a front end of the disk tray, and
an earth plate attached to a front end side of the disk tray to discharge static electricity; wherein
the static electricity generated at the front side of the disk tray is guided to the earth plate,
the disk tray has an earth plate attaching portion to which the earth plate is attached and a bezel attaching portion, separate from the earth plate attaching portion, to which the bezel is attached, and
the earth plate is attached directly to the earth plate attaching portion independently from the bezel, and the bezel is attached directly to the bezel attaching portion independently from the earth plate, wherein the earth plate remains fixed to the disk tray when the bezel is removed from the disk tray.

2. The disk drive according to claim 1, wherein the disk tray supports a supporting rotation means of a disk which rotates while supporting the disk.

3. The disk drive according to claim 1, further comprising an operating means to be operated when moving the disk tray located at the loading position toward the unloading position; wherein
the earth plate is set adjacently to the operating means.

4. The disk drive according to claim 1, further comprising an electrical displaying means for showing an operation state of the drive; wherein
the earth plate is set adjacently to the electrical displaying means.

5. The disk drive according to claim 1, wherein
the chassis case has conductivity,
the earth plate is electrically connected to the chassis case to supply static electricity generated at the front side of the disk tray to the chassis case when the disk tray is located at the loading position.

6. The disk drive according to claim 1, wherein when the bezel is removed from the disk tray, the earth plate fixed to the disk tray so as to cover at least a part of the front end face of the disk tray is exposed to the front end of the disk tray.

7. The disk drive according to claim 1,
the disk tray comprising the disk tray body and an inner bezel attached directly to the front end of the disk tray body, wherein
the earth plate is set between the disk tray body and the inner bezel, and
the bezel is attached to the front end of the disk tray so as to cover the inner bezel of the disk tray.

8. The disk drive according to claim 7, wherein the bezel formed like & plate is fixed to the inner bezel of the disk tray.

9. The disk drive according to claim 1, wherein the earth plate is attached to the disk tray body through an inner bezel by the earth plate being attached directly to the inner bezel and said inner bezel being attached to the disk tray body.

10. A manufacturing method of a disk drive, comprising:
a chassis case,
a disk tray capable of moving between a loading position inside the chassis case and an unloading position outside the chassis case while supporting a recording medium,
a bezel attached to the disk tray so as to cover the front end of the disk tray, and
an earth plate set to the front end side of the disk tray to discharge static electricity, comprising:
integrating the disk tray with the earth plate, and
subsequently integrating the bezel with the front end of the disk tray integrated with the earth plate.

11. The disk drive manufacturing method according to claim 10,
a disk tray comprising a disk tray body and an inner bezel attached to the front end of the disk tray body; wherein
the step of integrating the disk tray with the earth plate includes, a step of integrating the inner bezel with the earth plate and a step of integrating the inner bezel integrated with the earth plate with the disk tray body.

* * * * *

UNITED STATES PATENT AND TRADEMARK OFFICE
CERTIFICATE OF CORRECTION

| | | |
|---|---|---|
| PATENT NO. | : 7,134,128 B2 | Page 1 of 1 |
| APPLICATION NO. | : 10/697574 | |
| DATED | : November 7, 2006 | |
| INVENTOR(S) | : Nobuki Matsui et al. | |

It is certified that error appears in the above-identified patent and that said Letters Patent is hereby corrected as shown below:

Column 1, line 28, "Bet" should read --set--;

Column 4, line 26, "arid" should read --and--;

Column 7, line 36, "id" should read --1d--;

Column 13, line 14, "if" should read --1f--;

Column 14, line 8, "103b" should read --101b--; and

Column 16, claim 8, line 65, "& plate" should read --a plate--.

Signed and Sealed this

Eighth Day of April, 2008

JON W. DUDAS
*Director of the United States Patent and Trademark Office*